(12) United States Patent
Dardis et al.

(10) Patent No.: US 12,103,099 B2
(45) Date of Patent: Oct. 1, 2024

(54) SPATIAL MAPPING OF SENSOR DATA COLLECTED DURING ADDITIVE MANUFACTURING

(71) Applicant: RENISHAW PLC, Wotton-under-Edge (GB)

(72) Inventors: John Dardis, Stroud (GB); Kiera Megan Jones, Stroud (GB); Ceri Brown, Plaisance-du-Touch (FR); Nicholas Henry Hannaford Jones, Stroud (GB)

(73) Assignee: RENISHAW PLC, Wotton-under-Edge (GB)

(*) Notice: Subject to any disclaimer, the term of this patent is extended or adjusted under 35 U.S.C. 154(b) by 1112 days.

(21) Appl. No.: 16/759,182

(22) PCT Filed: Nov. 7, 2018

(86) PCT No.: PCT/GB2018/053225
§ 371 (c)(1),
(2) Date: Apr. 24, 2020

(87) PCT Pub. No.: WO2019/092415
PCT Pub. Date: May 16, 2019

(65) Prior Publication Data
US 2020/0276669 A1  Sep. 3, 2020

(30) Foreign Application Priority Data
Nov. 10, 2017  (GB) ...................................... 1718597

(51) Int. Cl.
*B23K 15/00* (2006.01)
*B22F 10/28* (2021.01)
(Continued)

(52) U.S. Cl.
CPC .......... *B23K 15/0086* (2013.01); *B22F 10/28* (2021.01); *B22F 10/36* (2021.01);
(Continued)

(58) Field of Classification Search
CPC .............. B23K 15/0086; B23K 26/342; B23K 15/0013; B23K 15/002; B23K 15/0026;
(Continued)

(56) References Cited

U.S. PATENT DOCUMENTS

| 5,844,673 A | 12/1998 | Ivers |
| 10,071,424 B2 | 9/2018 | Fager |

(Continued)

FOREIGN PATENT DOCUMENTS

| CN | 101144742 A | 3/2008 |
| CN | 100587428 C | 2/2010 |

(Continued)

OTHER PUBLICATIONS

Apr. 8, 2019 International Search Report issued in International Patent Application No. PCT/GB2018/053225.
(Continued)

*Primary Examiner* — Robert G Bachner
(74) *Attorney, Agent, or Firm* — Oliff PLC

(57) ABSTRACT

A method of generating a spatial map of sensor data collected during additive manufacturing, in which a plurality of layers of powder are selectively melted with an energy beam to form an object. The method includes receiving sensor data collected during additive manufacturing of an object, the sensor data including sensor values, the sensor values captured for different coordinate locations of the energy beam during the additive manufacturing of the object, and generating cell values for a corresponding cell-based spatial mapping of the sensor data. Each of the cell values is determined from a respective plurality of the sensor values (Continued)

extending over an area/volume comparable to an extent of the melt pool or the energy beam spot.

32 Claims, 17 Drawing Sheets

(51) Int. Cl.
    *B22F 10/36*      (2021.01)
    *B22F 10/366*      (2021.01)
    *B22F 12/41*      (2021.01)
    *B22F 12/44*      (2021.01)
    *B22F 12/49*      (2021.01)
    *B22F 12/90*      (2021.01)
    *B23K 26/342*      (2014.01)
    *B33Y 10/00*      (2015.01)
    *B33Y 50/00*      (2015.01)

(52) U.S. Cl.
    CPC ............ *B22F 10/366* (2021.01); *B22F 12/90* (2021.01); *B23K 26/342* (2015.10); *B33Y 10/00* (2014.12); *B33Y 50/00* (2014.12); *B22F 12/41* (2021.01); *B22F 12/44* (2021.01); *B22F 12/49* (2021.01)

(58) Field of Classification Search
    CPC .. B23K 26/032; B23K 26/082; B23K 31/125; B22F 10/28; B22F 10/36; B22F 10/366; B22F 12/90; B22F 12/41; B22F 12/44; B22F 12/49; B33Y 10/00; B33Y 50/00; B33Y 50/02; G01N 2021/8864; G01N 2021/8411; G01N 21/71; Y02P 10/25; B29C 64/153; G06T 7/0004
    See application file for complete search history.

(56) References Cited

U.S. PATENT DOCUMENTS

| | | | |
|---|---|---|---|
| 10,646,956 B2 | 5/2020 | Burbaum et al. | |
| 10,688,561 B2 | 6/2020 | Diaz et al. | |
| 2002/0164436 A1 | 11/2002 | Fischer et al. | |
| 2004/0200816 A1* | 10/2004 | Chung | G05D 23/1919 219/121.83 |
| 2009/0206065 A1 | 8/2009 | Kruth et al. | |
| 2011/0223349 A1 | 9/2011 | Scott | |
| 2013/0168902 A1* | 7/2013 | Herzog | B33Y 30/00 264/401 |
| 2014/0265048 A1 | 9/2014 | Burris et al. | |
| 2016/0098825 A1 | 4/2016 | Dave et al. | |
| 2016/0332384 A1 | 11/2016 | De Pena et al. | |
| 2017/0090462 A1 | 3/2017 | Dave et al. | |
| 2017/0175234 A1 | 6/2017 | Jennett et al. | |
| 2018/0036943 A1 | 2/2018 | Brown et al. | |
| 2018/0111321 A1 | 4/2018 | Herzog | |
| 2018/0322621 A1 | 11/2018 | Craeghs et al. | |
| 2018/0370144 A1 | 12/2018 | Revanur et al. | |
| 2019/0022946 A1 | 1/2019 | Jones et al. | |
| 2019/0283332 A1 | 9/2019 | Brown et al. | |

FOREIGN PATENT DOCUMENTS

| | | |
|---|---|---|
| CN | 103025507 A | 4/2013 |
| CN | 105188993 A | 12/2015 |
| CN | 105705291 A | 6/2016 |
| CN | 105965017 A | 9/2016 |
| CN | 105965018 A | 9/2016 |
| CN | 106457686 A | 2/2017 |
| CN | 106660123 A | 5/2017 |
| CN | 106984813 A | 7/2017 |
| CN | 107096920 A | 8/2017 |
| CN | 107175329 A | 9/2017 |
| EP | 1466718 A2 | 10/2004 |
| WO | 2007/147221 A1 | 12/2007 |
| WO | 2010/007396 A1 | 1/2010 |
| WO | 2016/156824 A1 | 10/2016 |
| WO | 2016/169768 A1 | 10/2016 |
| WO | 2017/085468 A1 | 5/2017 |
| WO | 2017/085469 A1 | 5/2017 |
| WO | 2017/087451 A1 | 5/2017 |

OTHER PUBLICATIONS

Apr. 8, 2019 Written Opinion issued in International Patent Application No. PCT/GB2018/053225.

May 22, 2018 Search Report issued in British Patent Application No. 1718597.6.

Jun. 26, 2019 Search Report issued in European Patent Application No. 18204804.1.

S. Clijsters et al. "In Situ Quality Control of the Selective Laser Melting Process Using a High-Speed, Real-Time Melt Pool Monitoring System". International Journal of Advanced Manufacturing Technology (2014), vol. 75, pp. 1089-1101.

Stijn Clijsters. "Development of a Smart Selective Laser Melting Process". Mar. 2017.

* cited by examiner

Build Layout of B5171_10usDrillDelay_440usPipelineDelay

| Sample Number | Parameter Set | Laser Power (W) | Point Distance (μm) | Hatch Distance (μm) | Exposure (μs) | 2D Energy Density |
|---|---|---|---|---|---|---|
| 0 | 1 | 350 | 70 | 70 | 40 | 2.86 |
| 17 | 1 | 350 | 70 | 70 | 40 | 2.86 |
| 37 | 1 | 350 | 70 | 70 | 40 | 2.86 |
| 1 | 2 | 500 | 90 | 110 | 40 | 2.02 |
| 21 | 2 | 500 | 90 | 110 | 40 | 2.02 |
| 26 | 2 | 500 | 90 | 110 | 40 | 2.02 |
| 2 | 3 | 200 | 70 | 90 | 40 | 1.27 |
| 14 | 3 | 200 | 70 | 90 | 40 | 1.27 |
| 33 | 3 | 200 | 70 | 90 | 40 | 1.27 |
| 3 | 4 | 350 | 90 | 90 | 60 | 2.59 |
| 22 | 4 | 350 | 90 | 90 | 60 | 2.59 |
| 34 | 4 | 350 | 90 | 90 | 60 | 2.59 |
| 4 | 5 | 500 | 110 | 70 | 40 | 2.60 |
| 23 | 5 | 500 | 110 | 70 | 40 | 2.60 |
| 30 | 5 | 500 | 110 | 70 | 40 | 2.60 |
| 5 | 6 | 200 | 110 | 70 | 60 | 1.56 |
| 19 | 6 | 200 | 110 | 70 | 60 | 1.56 |
| 27 | 6 | 200 | 110 | 70 | 60 | 1.56 |
| 6 | 7 | 500 | 70 | 110 | 60 | 3.90 |
| 25 | 7 | 500 | 70 | 110 | 60 | 3.90 |
| 36 | 7 | 500 | 70 | 110 | 60 | 3.90 |
| 7 | 8 | 200 | 70 | 110 | 80 | 2.08 |
| 18 | 8 | 200 | 70 | 110 | 80 | 2.08 |
| 38 | 8 | 200 | 70 | 110 | 80 | 2.08 |
| 8 | 9 | 500 | 110 | 90 | 80 | 4.04 |
| 24 | 9 | 500 | 110 | 90 | 80 | 4.04 |
| 28 | 9 | 500 | 110 | 90 | 80 | 4.04 |
| 9 | 10 | 500 | 70 | 70 | 80 | 8.16 |
| 20 | 10 | 500 | 70 | 70 | 80 | 8.16 |
| 29 | 10 | 500 | 70 | 70 | 80 | 8.16 |
| 10 | 11 | 200 | 90 | 70 | 80 | 2.54 |
| 15 | 11 | 200 | 90 | 70 | 80 | 2.54 |
| 31 | 11 | 200 | 90 | 70 | 80 | 2.54 |
| 11 | 12 | 350 | 110 | 110 | 80 | 2.31 |
| 16 | 12 | 350 | 110 | 110 | 80 | 2.31 |
| 35 | 12 | 350 | 110 | 110 | 80 | 2.31 |
| 12 | 13 | 200 | 110 | 110 | 40 | 0.66 |
| 13 | 13 | 200 | 110 | 110 | 40 | 0.66 |
| 32 | 13 | 200 | 110 | 110 | 40 | 0.66 |

FIG. 7b

SPATIAL MAPPING OF SENSOR DATA COLLECTED DURING ADDITIVE MANUFACTURING

FIELD OF INVENTION

This invention concerns apparatus and method for spatially mapping sensor data collected during additive manufacturing, such as in a powder bed fusion apparatus. The invention has particular, but not exclusive application to spatially mapping sensor data in two-dimensions or three-dimensions for visualisation of the sensor data and/or for in-process control.

BACKGROUND

Additive manufacturing or rapid prototyping methods for producing parts comprise layer-by-layer solidification of a flowable material. There are various additive manufacturing methods, including material bed systems, such as selective laser melting (SLM), selective laser sintering (SLS) and stereolithography systems.

In selective laser melting, a powder layer is deposited on a powder bed in a build chamber and a laser beam is scanned across portions of the powder layer that correspond to a cross-section (slice) of the object being constructed. The laser beam melts the powder to form a solidified layer. After selective solidification of a layer, the powder bed is lowered by a thickness of the newly solidified layer and a further layer of powder is spread over the surface and solidified, as required. In a single build, more than one object can be built, the parts spaced apart in the powder bed.

WO 2007/147221 A1 discloses a selective laser melting apparatus comprising a scanner for scanning the laser beam across the powder surface and a spatially resolved detector (e.g. a CCD or CMOS camera) or an integrated detector (e.g. a photodiode with a large active area) for capturing radiation emitted by a melt zone and transmitted through an optical system of the scanner.

US 2013/0168902 A1 discloses a method for producing a three-dimensional component by means of a laser melting process, wherein sensor values captured using the device disclosed in WO 2007/147221 A1 are stored together with coordinate values that locate the sensor values in the component and are displayed by means of a visualisation unit in a two- and/or multi-dimensional representation with respect to the detection location of the sensor value in the component. The visualization method may be used to display values captured from the melt pool during the building process, directly after the completion of and/or still during the building process.

"In situ quality control of the selective laser melting process using a high-speed, real-time melt pool monitoring system", S. Clijsters, T Craeghs, S Buls, K Kempen, J-P Kruth, International Journal of Advanced Manufacturing Technology, (2014) 25: 1089-1101 discloses an in-situ monitoring system for selective laser melting (SLM). Visualisation of the sensor values is done by a "mapping algorithm", which transfers the measurements from a time-domain into a position-domain representation. A sample/picture of the melt pool is taken every 100 μm. The measured melt pool data is mapped on a regular grid. Melt pool data is assigned to the pixel which is closest to the corresponding logged position. When more than one data point is assigned to a pixel, the average of all data inside the pixel is taken. Each pixel of the mapped image is 100 μm by 100 μm. The pixel size is selected based on the expected melt pool size (around 120-150 μm diameter) and sample rate.

SUMMARY OF INVENTION

According to a first aspect of the invention there is provided a method of generating a spatial map of sensor data collected during additive manufacturing, in which a plurality of layers of powder are selectively melted with an energy beam to form an object, the method comprising receiving sensor data collected during additive manufacturing of an object, the sensor data comprising sensor values, the sensor values captured for different coordinate locations of the energy beam during the additive manufacturing of the object, and generating cell values for a corresponding cell-based spatial mapping of the sensor data, wherein each of the cell values is determined from a respective plurality of the sensor values extending over an area/volume comparable to an extent/dimension of the melt pool or the energy beam spot.

It will be understood that "comparable" as used herein means that the area/volume is about the same as or slightly larger than a physical dimension or influence of the melt pool and/or energy beam spot. Typically, the plurality of the sensor values extend over an area/volume that is about the same size as or between 1× to 2× larger than a dimension of the melt pool and/or energy beam spot. For a typical metal powder bed fusion apparatus, a melt pool may have a width of around 100 to 150 microns and a depth of around 75 to 250 microns. Accordingly, the plurality of the sensor values may extend over an area/volume of between 70 microns and 500 microns in order to be representative of the melt pool. For a typical metal powder bed fusion apparatus, the energy beam spot may have a ($1/e^2$) width of around 70 to 80 microns. Accordingly, the plurality of the sensor values may extend over an area/volume of between 65 microns and 160 microns in order to be representative of the energy beam spot.

An average number of sensor values from which cell values are determined may be 2 or more, preferably 5 or more. This may allow the sensor data to be spatially mapped at a resolution higher than the melt pool size.

It is possible to obtain sensor data at a sampling frequency (e.g. of 100 kHz) corresponding to a distance moved by the energy beam spot (which typically moves at 1 to 4 m/s) smaller than a dimension of the melt pool and/or energy beam spot (e.g. 10 to 40 micrometres per sensor value compared to 100 micrometre melt pool width or 70 micrometre energy beam spot). However, in the case of sensors having a field of view for monitoring an entire melt pool region or monitoring the energy beam, the sensor values are derived from a region or associated with an influence on a region (in the case of the energy beam spot) that is larger than the 10 to 40 micrometres resolution attributable to positions of a centre of the energy beam when the sensor value is generated. Accordingly, attributing each sensor value to a 10 to 40 micrometre region may not fairly represent an area/volume from which the sensor value was derived and, as such, may not enable a user to identify defects, such as porosity in the object, under-dosing of powder in a layer or a coverage of the energy beam. The invention merges the sensor values to provide cell values that are representative of the influence of exposures over this wider area/volume. In this way, the spatial mapping of the sensor values is more representative of the physical processes taking place at the powder layer captured by the sensor data. Such mappings of the sensor data may be termed macro- or meso-mappings of the sensor data allowing the user/operator to view defects in the build having these proportions.

Each cell may represent a spatial extent comparable to the size of the melt pool or the energy beam spot. Alternatively, each cell may have a spatial extent significantly smaller than the size of the melt pool or the energy beam spot but whose value is determined from a respective plurality of the sensor values extending over the area/volume comparable to the melt pool or the energy beam spot and thus beyond a spatial extent of the cell.

Each cell value may be determined from a plurality of sensor values in one or more of the different ones of the plurality of layers. Each cell value may be determined from a plurality of sensor values within a defined distance, such as a user/operator defined distance, of a centre/location of the cell. The defined distance may be the spatial extent of the cell, (for example, the plurality of sensor values falling within the spatial extent of each cell) or a distance beyond the spatial extent of the cell.

Determining each cell value may comprise a summation of the respective plurality of sensor values. The summation may be a weighted summation of the respective plurality of sensor values. Each sensor value may be weighting based upon a distance from a cell location to a coordinate position of the sensor value. In this way, determination of the cell value may take into account a relationship between an influence of a melt pool/exposure and distance from the melt pool/exposure.

A blurring (box (mean) blur, a Gaussian blur or other appropriate blurring based upon a model of the melting process) may be used to smooth the sensor values out among the cells of the cell-based spatial mapping. The method may comprise receiving an input defining a sigma value for the Gaussian blurring, a blur radius and/or a pixel/voxel size. This may provide a mapping representing an amount of energy input or emitted from a region, which may correlate with an extent of melting in that region. The blur radius may be comparable to an extent of the melt pool or the energy beam spot. The sigma value for the Gaussian blur may be selected based upon the extent of the melt pool or the energy beam spot. For example, a sigma value of between 20 to 80 micrometres may be selected.

Alternatively, determining each cell value may comprise assigning a value corresponding to a maximum value or extreme value of the respective plurality of sensor values. This may be desirable for the identification of undesirable extreme events that occur during the additive manufacturing process, such as unwanted surges in power of the energy beam.

The plurality of sensor values used for the generation of a cell value or the algorithm used to generate the cell value may be based upon directionality of a scan (scan direction and/or hatch formation direction) or a time of capture of the sensor values during the additive manufacturing process. An effect of an exposure of the energy beam or a melt pool may differ dependent upon whether the exposure or melt pool is generated on an area of powder or a previously melted/solidified area and/or a relative time between exposures or the capture of sensor values. Accordingly, an algorithm for determining the cell values may take such effects into account. For example, the algorithm may apply a blur based upon a skewed normal distribution.

The method may comprise receiving a user/operator input defining the area/volume and determining the respective plurality of sensor values to use in determining the cell value based upon the user/operator input. Alternatively, the area/volume may be pre-set or determined from scan parameters, such as scan speed, energy beam power, spot size, exposure time, point distance, hatch spacing, etc and/or sensor parameters, such as sampling rate, a size of a field of view, etc.

It may be useful to also visualise the sensor data at a micro level. For example, generating further, second cell values for a corresponding further, second cell-based spatial mapping of the sensor data, wherein each of the second cell values is determined from a respective one or more sensor values extending over a second area/volume smaller than a size of the melt pool and the energy beam spot. Such a mapping may be useful in determining motion control errors of the additive manufacturing apparatus. A spatial extent represented by each further, second cell may be 60 microns or less, and preferably is 40 microns or less. Such a mapping is likely to produce a significant number of the further, second cells having no or low values compared to much higher values for other further, second cells because, during the additive manufacturing process, the energy beam is directed to locations on each powder layer that are spaced apart by more than 60 microns. However, viewing the sensor data at this resolution may allow motion control artefacts to be identified more easily.

The sensor data may comprise sensor values derived from radiation emitted from melted regions, such as melt pools, and/or plasma generated during the additive manufacturing process. For example, the sensor data may be values captured by photodiodes or cameras arranged to view the melted region through an optical train used to deliver a laser beam, such as described in WO2007/147221.

The sensor data may comprise laser spot positions derived from measured positions of elements, such as mirrors, of a scanner during the additive manufacturing process, such as described in GB 1707807.2, incorporated herein by reference. The sensor values may be a comparison of measured positions to corresponding demand positions for the laser spot.

The sensor data may comprise values derived from a beam monitoring sensor. For example, the sensor values may be derived from a photodiode monitoring the laser beam. The sensor values may be a measurement of energy beam power or a measurement of energy beam modulation. The sensor values may be a comparison between measured energy beam powers and corresponding demand laser powers or measured energy beam modulations and corresponding demand energy beam modulations. The comparison of energy beam modulations may be a comparison of durations of measured energy beam pulses to corresponding demand durations or a comparison of measured initiation times of energy beam pulses to corresponding demand initiation times.

The sensor values used to generate the cell values may comprise a combination of the values from the different sensors, for example, a subset of the sensor values derived from a sensor for monitoring melted regions of the powder generated when the energy beam is switched on as measured by a further sensor. Sensor values generated when the energy beam is off cannot be attributed to the presence of a melt pool.

The cell-based spatial mapping may be a volumetric model of the sensor values. The method may comprise building-up the volumetric model during the additive manufacturing of the object build wherein voxel layers of the volumetric model are sequentially added as sensor data is received. A voxel size of the volumetric model may be greater than a thickness of a layer in the additive manufacturing process and the method may comprise adding a voxel layer upon receipt of sensor data for a plurality of layers of the additive manufacturing process.

The cell-based spatial mapping may be one or more two-dimensional models of the sensor values. The or each two-dimensional model may correspond to a layer of the additive manufacturing process.

The method may comprise determining the cell values during the additive manufacturing process.

The method may comprise generating a display of the sensor data based upon the cell-based spatial mapping. The display may be generated during the additive manufacturing of the object.

Alternatively or additionally, the method may further comprise carrying out a computer-implemented image analysis of the cell-based spatial mapping to identify features of interest. For example, the image analysis may automatically identify pores or the like and/or carry out pattern recognition. The method may comprise adjusting the additive manufacturing process based upon computer-implemented image analysis of the cell-based spatial mapping. The spatial mapping may be useful for closed loop control of an additive manufacturing apparatus.

The method may comprise comparing one or more of the cell values to a target value or range (setpoint value) and adjusting the additive manufacturing process based upon the comparison. The target value or range may be determined from an average cell value for sensor data generated when producing one or more test parts having a required/target density. The average cell value may be an average of cell values each determined from a summing of the respective plurality of sensor values, in particular using an algorithm which carries out a weighted sum of the respective plurality of sensor values based upon a distance from a cell position, such as blurring, for example a Gaussian blur. It has been found that there is a close correlation between the cell values, in particular summed cell values, and a density of the object being built. Accordingly, the cell values can be used as feedback for process control.

The method may comprise carrying out closed loop control during additive manufacturing based upon the comparison of the one or more cell values to the target cell value or range.

The control may by adjusting at least one scanning parameter. The at least one scanning parameter may be adjusted to alter a radiant exposure/fluence achieved by the scan of the energy beam. The at least one scanning parameter may be a power of the energy beam, a focus of the energy beam and/or a spot size of the energy beam on the powder bed. The scanning parameters may be adjusted from a planned scanning regime for a layer to fix defects detected in a previous layer from the cell based mapping. A scanner of the additive manufacturing apparatus may be in accordance with the scanner as described in WO2016/156824, which is incorporated herein by reference, and the scanning parameter that is adjusted may be a speed or frequency of movement of the mirror having the faster dynamics to adjust a distribution of the laser energy.

Additionally or alternatively, the control may be adjusting dosing of powder, for example, the dosing of an additional powder layer or dosing of powder in selected regions to fill detected pores.

The target value or range may be one selected from a plurality of target values or ranges dependent upon an attribute of the scan that generates the cell value. For example, the plurality of target values or ranges may comprise different target values or ranges for different locations in the additive manufacturing apparatus and/or different scan directions in the additive manufacturing apparatus. Typically, the environment in the additive manufacturing apparatus is not the same for each location on a surface of the powder bed and for each scan direction. In particular, an angle of the energy beam to the surface, a nature of the gas flow at a location of the scan and/or a direction of a scan relative to a gas flow direction of a gas knife generated across the surface can create different scan conditions for different locations and different scan directions. This can result in different target values or ranges for different scan directions and scan locations on the powder bed.

The method may comprise comparing an aggregation of cell values, such as an average cell value for cell values of an area or along a scan line to the target value or range. It may be desirable to carry out comparisons on a scale larger than a single cell value.

According to a second aspect of the invention there is provided a method of spatially mapping sensor data collected during additive manufacturing, in which a plurality of layers of powder are selectively melted with an energy beam to form an object, the method comprising receiving sensor data collected during additive manufacturing of an object, the sensor data comprising sensor values, the sensor values captured for different coordinate locations of the energy beam during the additive manufacturing of the object, and generating cell values for a corresponding cell-based spatial mapping of the sensor data, wherein each of the cell values is determined from a respective plurality of the sensor values associated with different ones of the plurality of layers.

The different ones of the plurality of layers may be a subset of the total number of the (plurality of) layers solidified to form the object. The subset may be sensor values of a defined number of layers, such as a user/operator defined number of layers. The subset may comprise at least two layers. The subset may comprise two to twenty layers and preferably two to ten layers. The subset may be a number of layers which substantially corresponds to a depth of a melt pool generated during the additive manufacturing process.

The method may comprise visualising the cell-based spatial mapping during receipt of the sensor data and/or during the additive manufacturing of the object.

According to a third aspect of the invention there is provided a method of spatially mapping sensor data collected during additive manufacturing, in which a plurality of layers of powder are selectively melted with an energy beam to form an object, the method comprising receiving sensor data collected during additive manufacturing of an object, the sensor data comprising sensor values, the sensor values captured for different coordinate locations of the energy beam during the additive manufacturing of the object, and generating cell values for a corresponding cell-based spatial mapping of the sensor data, wherein each of the cell values is determined from a respective plurality of the sensor values based upon a predetermined distance from a cell location, such as a centre of the cell, wherein the predetermined distance is input by a user/operator.

According to a fourth aspect of the invention there is provided a method for visualising sensor data collected during an additive manufacturing build, the method comprising receiving sensor data from an additive manufacturing apparatus in batches as the additive manufacturing of the object progresses, progressively building-up a three-dimensional mapping of the sensor data as the batches of sensor data are received and generating a display of the three-dimensional mapping as the three-dimensional mapping is built-up.

In this way, a three-dimensional mapping can be displayed to a user during the additive manufacturing of the object. Each batch of sensor data may be sensor data for a pre-set number of layers, such as a single layer, of the additive build. The three-dimensional mapping may be a voxel based spatial mapping of the sensor data, a value of each voxel determining from sensor data for a plurality of layers of the additive build.

The method may comprise generating a plurality of two-dimensional mappings of the sensor data based upon sensor data and then generating the three-dimensional mapping from the plurality of two-dimensional mappings. Each voxel of the three-dimensional mapping may be determined from multiple pixels of the plurality of two-dimensional mappings. Each of the two-dimensional mappings may be a spatial mapping as determined in accordance with the first, second or third aspects of the invention.

The method may comprise displaying the three-dimensional mapping at a location remote from the additive manufacturing apparatus. The sensor data may have been communicated from the additive manufacturing apparatus over a network, such as the Internet.

According to a fifth aspect of the invention there is provided a method of controlling an additive manufacturing process, in which a plurality of layers of powder are selectively melted with a laser beam to form an object, the method comprising receiving sensor data collected during additive manufacturing of an object, the sensor data comprising sensor values generated by a sensor for detecting radiation collected by an optical train used for steering the laser beam onto powder, the sensor values captured for different coordinate locations of the energy beam during the additive manufacturing of the object, generating a process value from a plurality of the sensor values, comparing the process value to a setpoint value and adjusting the additive manufacturing process based upon the comparison.

The plurality of sensor values may extend over an area/volume comparable to an extent of the melt pool or the energy beam spot. The process value may be generated by applying a low pass filter to an output of sensor values, such as a low pass filter having a cosine window, for example a Han or Hamming window, wherein a width of the window is comparable to the extent/dimension of the melt pool or the energy beam spot.

The process value may be determining by summing the plurality of sensor values.

Each sensor value may be associated with a corresponding layer of a plurality of layers solidified during the additive manufacturing of the object and a coordinate value localising the sensor value to a point within the corresponding layer, wherein the process value is determined from a weighted sum of the plurality of the sensor values, a weighting for each sensor value determined from a location of the sensor value. The method may comprise determining a process value for a process value location within a layer, the process value determined by summing the plurality of sensor values based upon a distance of each sensor value from the process value location.

Alternatively, the plurality of sensor values may be the sensor values generated over a specified time period, such as a time period of the order of hundreds of microseconds. The process value may be determined from a weighted sum of the plurality of the sensor values, a weighting for each sensor value determined from a relative time at which the sensor value was generated.

The process value corresponds to a "snap-shot" of the process for a particular state of progression of the process.

Adjusting the additive manufacturing process may comprise adjusting parameters of an additive manufacturing apparatus during manufacture of the object or adjusting parameters of the additive manufacturing process for manufacture of a further object using the additive manufacturing process.

According to a sixth aspect of the invention there is provided a data carrier having instructions stored thereon, wherein the instructions, when executed by a processor cause the processor to carry out the method of the first, second, third. fourth and/or fifth aspect(s) of the invention.

The data carrier may be a suitable medium for providing a machine with instructions such as non-transient data carrier, for example a floppy disk, a CD ROM, a DVD ROM/RAM (including −R/−RW and +R/+RW), an HD DVD, a Blu Ray™ disc, a memory (such as a Memory Stick™), an SD card, a compact flash card, or the like), a disc drive (such as a hard disc drive), a tape, any magneto/optical storage, or a transient data carrier, such as a signal on a wire or fibre optic or a wireless signal, for example a signals sent over a wired or wireless network (such as an Internet download, an FTP transfer, or the like).

According to a seventh aspect of the invention there is provided a visualisation system comprising a display and a processor, the processor arranged to receive sensor data from an additive manufacturing apparatus, carry out the method of the first, second and/or third aspect(s) of the invention to generate cell values for a corresponding cell-based spatial mapping of the sensor data and cause the display to display a representation of the sensor values based on the cell-based spatial mapping.

According to an eighth aspect of the invention there is provided a visualisation system comprising a display and a processor, the processor arranged to receive sensor data from an additive manufacturing apparatus, carry out the method of the fourth aspect(s) of the invention to generate a three-dimensional mapping of the sensor data and cause the display to display a representation of the three-dimensional mapping of the sensor data.

The visualisation apparatus may be connected to the additive manufacturing apparatus over a network, such as the Internet.

According to a ninth aspect of the invention there is provided a controller for an additive manufacturing apparatus, the controller comprising a processor arranged to receive sensor data from one or more sensors of the additive manufacturing apparatus, carry out the method of the first, second and/or third aspect(s) of the invention to generate cell values for a corresponding cell-based spatial mapping of the sensor data, analyse the cell-based spatial mapping and control modules of the additive manufacturing apparatus to adjust an additive manufacturing process based upon results of the analysis.

DESCRIPTION OF THE DRAWINGS

FIG. 7b is a table showing the scan parameters used to form each test part shown in FIG. 7a;

DESRIPTION OF EMBODIMENTS

Figure 1:
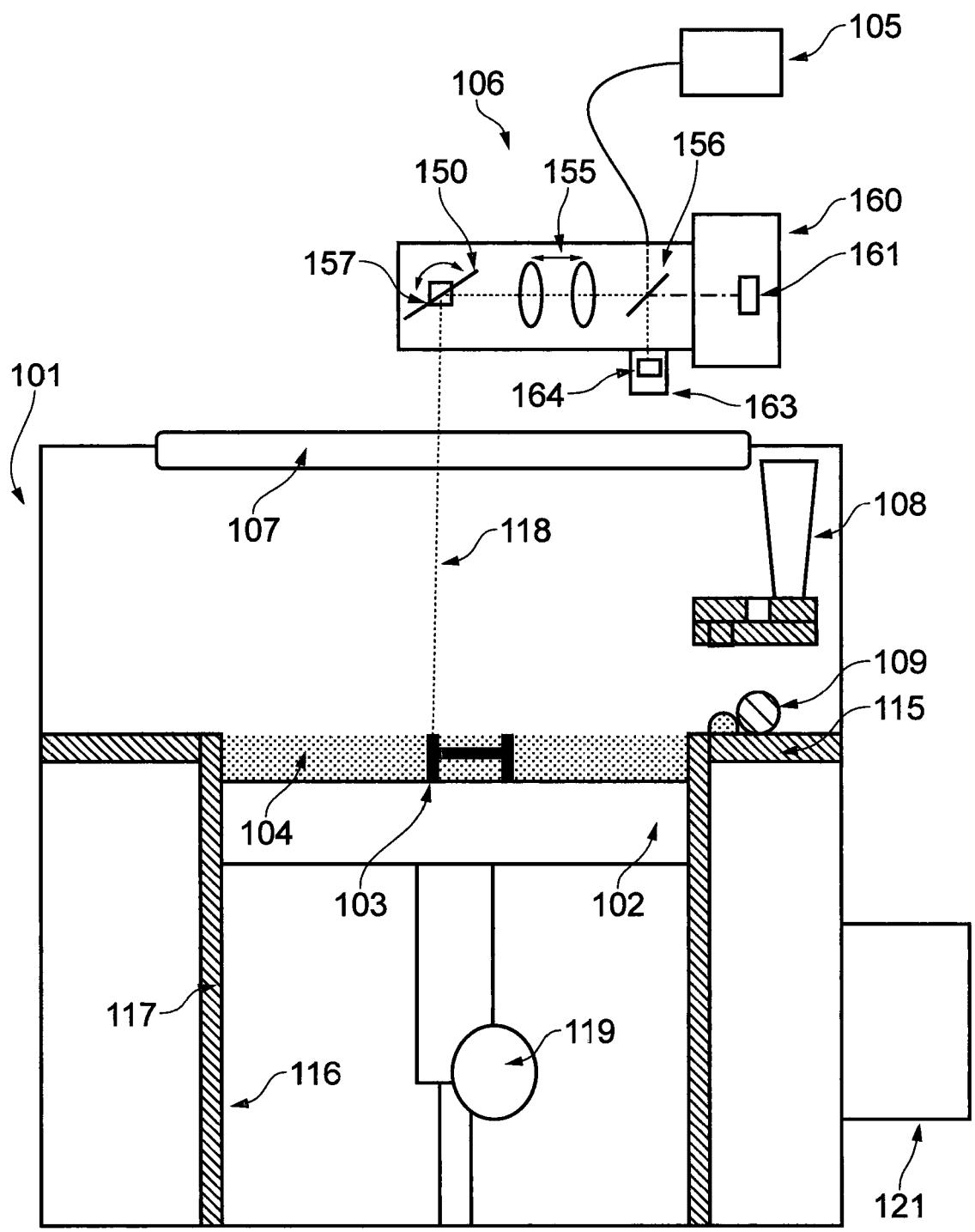
FIG. 1 is a schematic illustration of an additive manufacturing apparatus according to one embodiment of the invention.

Referring to FIG. 1, an additive manufacturing apparatus according to an embodiment of the invention comprises a build chamber 101 having therein a top plate 115 providing a surface onto which powder can be deposited and a build sleeve 117 in which a build platform 102 is movable. The build sleeve 117 and build platform 102 define a build volume 116 in which an object 103 is built by selective laser melting powder 104. The build platform 102 supports the object 103 and a powder bed 104 during the build. The platform 102 is lowered within the build sleeve 117 under the control of motor 119 as successive layers of the workpiece 103 are formed.

Layers of powder are formed across a working plane by lowering the platform 102 and spreading powder dispensed from dispensing apparatus 108 using wiper 109. For example, the dispensing apparatus 108 may be apparatus as described in WO2010/007396.

At least one laser module, in this embodiment laser module 105 generates a laser 118 for melting the powder 104. The lasers 118 are directed as required by a corresponding scanner, in this embodiment optical module 106. The laser beam 118 enters the chamber 101 via a window 107. In this embodiment, the laser module 105a comprises a fibre lasers, such as Nd YAG fibre lasers. The laser beam enters the optical module from above and is directed over the surface (the working plane) of the powder bed 104 by movable mirrors tiltable mirrors 150 (only one of which is shown for the optical module 106). One of the mirrors 150 is tiltable to steer the laser beam in an X-direction and the other tiltable mirror 150 is tiltable to steer the laser beam in a Y-direction perpendicular to the X-direction. Movement of each tiltable mirror 150 is driven by a galvanometer. A position of each galvanometer is measured by a transducer 157. In this embodiment, the transducer is in accordance with the transducer described in U.S. Pat. No. 5,844,673. The optical module 106 further comprises movable focussing optics 155 for adjusting the focal length of the corresponding laser beam.

A beam splitter 156 directs light of the laser wavelength from an input to the tiltable mirrors 150 and transmits light of other wavelengths that is emitted from the powder bed 104 to an in-process monitoring module 160. In process monitoring module 160 comprises at least one photodetector 161 for detecting an integrated intensity and/or spatial intensity of the transmitted light. The scanner further comprises a beam dump 163 for collecting a small proportion of the laser light that passes through the beam splitter 156. In the beam dump 163 is a beam monitor 164 which generates sensor signals based upon the laser light that is transmitted to the beam dump 163.

The signals from sensors 157, 161 and 164 are sent and stored in controller 121. As described in WO2017/085469, each sensor value is associated with a time stamp with a time at which the sensor value was generated and measured positions of mirrors 150. The controller 121 packages the sensor data for a layer together with demand data for that layer, such as the demand positions for the mirrors at different times during solidification of the layer, demand laser modulation, demand laser power and layer thickness. The package may also comprise laser parameters such as laser spot size, hatch spacing, point spacing and exposure time. As the build progresses, the controller 121 packages this data on a per layer basis and transmits this to visualisation apparatus.

Figure 3:
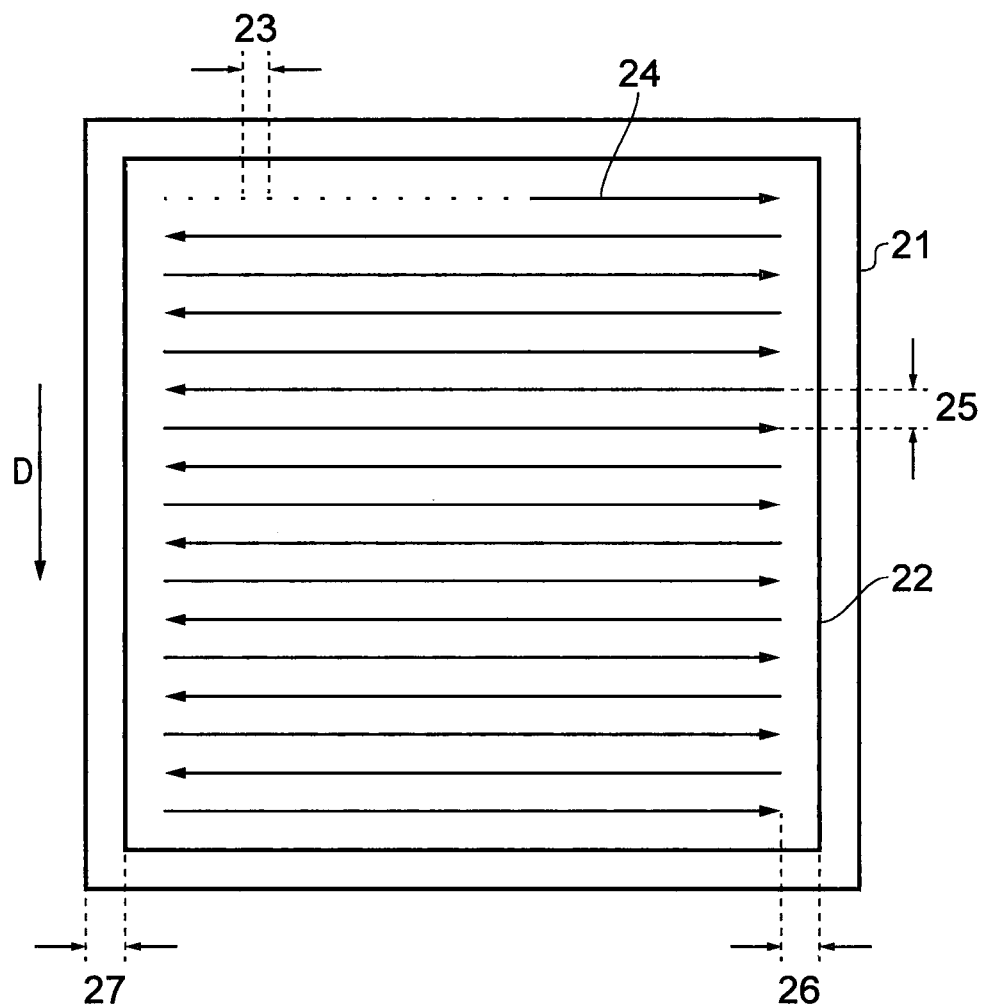
FIG. 3 illustrates laser parameters used in the additive manufacturing apparatus.

FIG. 3 illustrates some of the main laser scanning parameters. The arrows indicate a laser scanning pattern across a sample. FIG. 3 shows a boundary 21, inside which there is a fill contour 22. A fill contour offset 27 constitutes the distance between the boundary 21 and the fill contour 22. The laser scanning pattern covers substantially all of the sample within the fill contour 22. The laser scanning pattern constitutes a path (indicated by the arrows) made up of a series of laser spots. For illustrative purposes, a few of these laser spots are shown individually in the top line of the laser scanning pattern. The distance from a given laser spot to the next laser spot in the sequence is known as the point distance 23. An exposure time sets a time that each spot is exposed to the laser beam. Each line within the laser scanning pattern is known as a hatch 24. The laser scanning pattern illustrated in FIG. 3 comprises 17 substantially parallel hatches; the laser scans in a first direction along a first hatch, then in a second opposite direction along a second hatch, then in the first direction along a third hatch, then in the second opposite direction along a fourth hatch and so on. The distance from an end of a hatch 24 to the fill contour 22 is known as the hatch offset 26. Hatch direction D is a direction in which the hatches are successively completed. The distance between one hatch and the next hatch in the sequence, e.g. between a sixth hatch and a seventh hatch, is known as the hatch distance 25.

In other machines, rather than the laser spot being scanned along a hatch line in a series of point exposures, a laser spot is scanned continuously along the hatch lines. In such an arrangement, it is typical for scan speed to be a defined scan parameter rather than point distance and exposure time.

Figure 2:
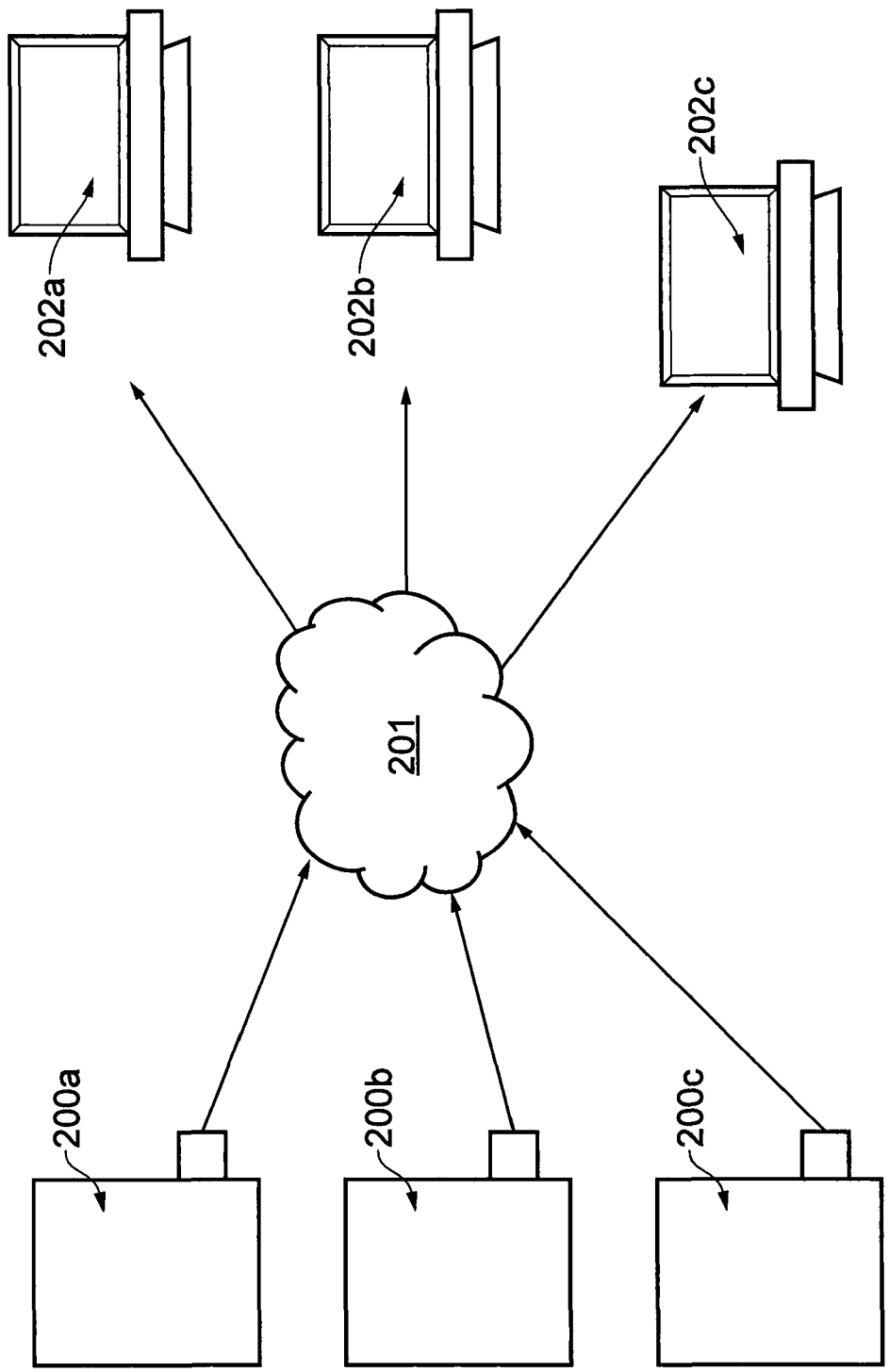
FIG. 2 shows the additive manufacturing apparatus connected to visualisation apparatus.

FIG. 2 illustrates a plurality of additive manufacturing apparatus 200a, 200b, 200c connected across a network 201, such as the Internet, to visualisation apparatus 202a, 202b, 202c. Each visualisation apparatus may visualise sensor data from any one of the plurality of additive manufacturing apparatus 200a, 200b, 200c.

On receipt of a package of sensor data for a layer, the visualisation apparatus generates a two-dimensional pixel map of the sensor data based upon user settings and a representation of this two-dimensional spatial map can be displayed on a display of the visualisation apparatus, if requested by a user. The user settings comprise pixel size, and an algorithm for calculating the pixel values.

To determine the pixel values, first a position is attributed to each sensor value of the sensor data selected to be visualised. The position is based upon the measured mirror positions or the demand positions for the mirrors at the time the sensor value was generated. For the photodiode data of detector 161, the sensor values may be reduced to those that were generated when the laser was firing, for example as determined from the demand data for laser modulation or the detector 164 in the beam dump 163. Pixel values are then determined from this reduced set of sensor values and the selected algorithm. In this embodiment, the selected algorithm may be any one of the maximum sensor value of the sensor values that fall within a spatial extent of the pixel, a mean of the sensor values that fall within a spatial extent of the pixel, an extreme value of the sensor values that fall within a spatial extent of the pixel or a sum of the sensor values that fall within a spatial extent of the pixel; the algorithm may incorporate Gaussian blurring.

Figure 4:
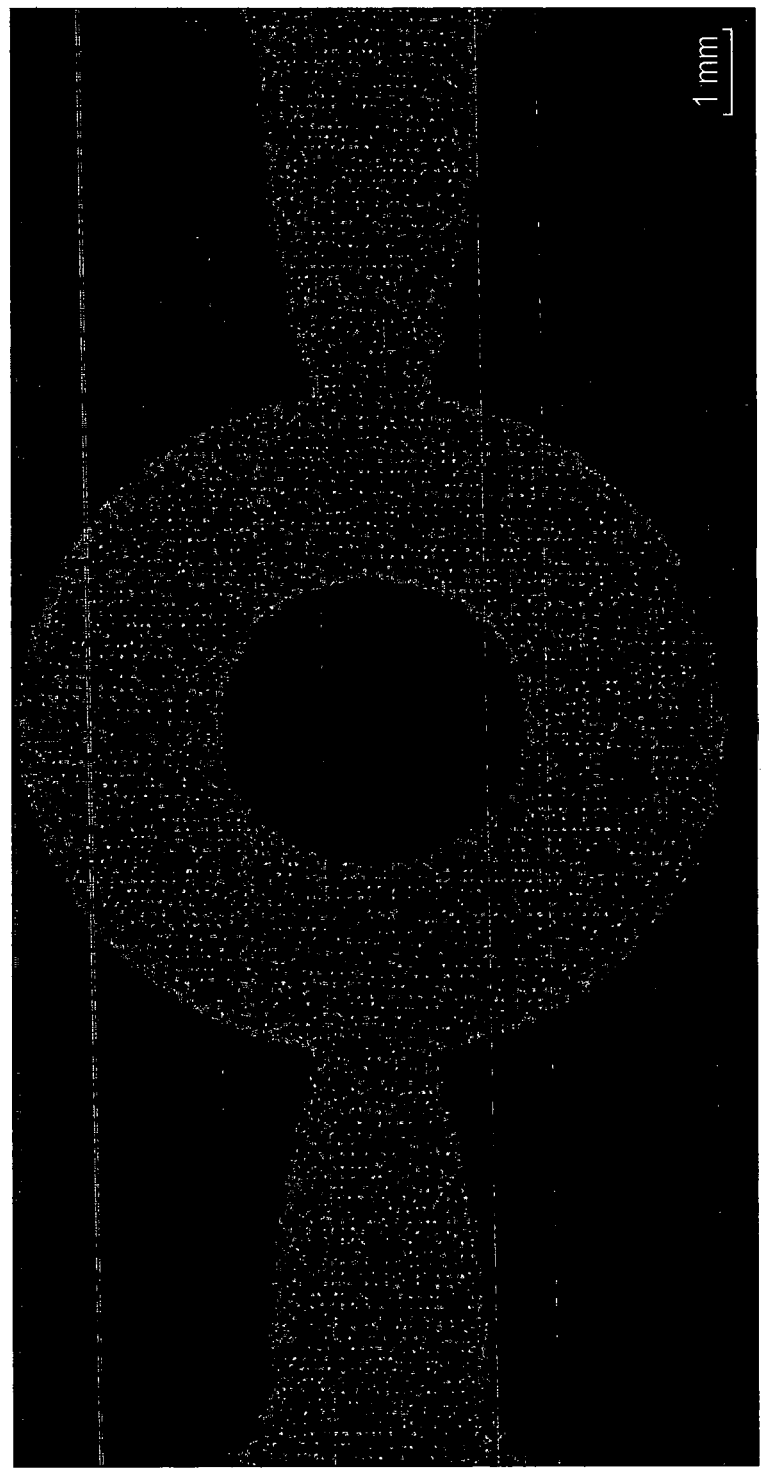
FIG. 4 is a two-dimensional visualisation of sensor data based upon a two-dimensional spatial mapping having 40 micrometre pixels using summed sensor values without a Gaussian blur.

FIG. 4 illustrates a visualisation of sensor data based upon a cell-based mapping having a pixel size of 40 micrometres. Each pixel value is determined by summing the sensor values that fall within the pixel. As can be seen, this results in a few pixels having a high intensity (high relative value) surrounded by pixels having a low intensity value (low relative value). This is because exposures occur at positions spaced apart by more than 40 micrometres. The sensor data from photodetector 161 is derived from radiation emitted from the melt pool and the resultant plasma, which, for a metal machine, typically extends over an area having a width of around 100 to 120 micrometres. Accordingly, visualisation of the sensor data based on this mapping, as shown in FIG. 4, may not generate a fair representation of the coverage of the solidification process across the layer and, as such, may not provide a useful visualisation for determining defects such as the presence of porosity or under-dosing of a layer. However, such a mapping may be useful for identifying defects in motion control of the mirrors 150 and the synchronisation with modulation of the laser beam.

Figure 5:
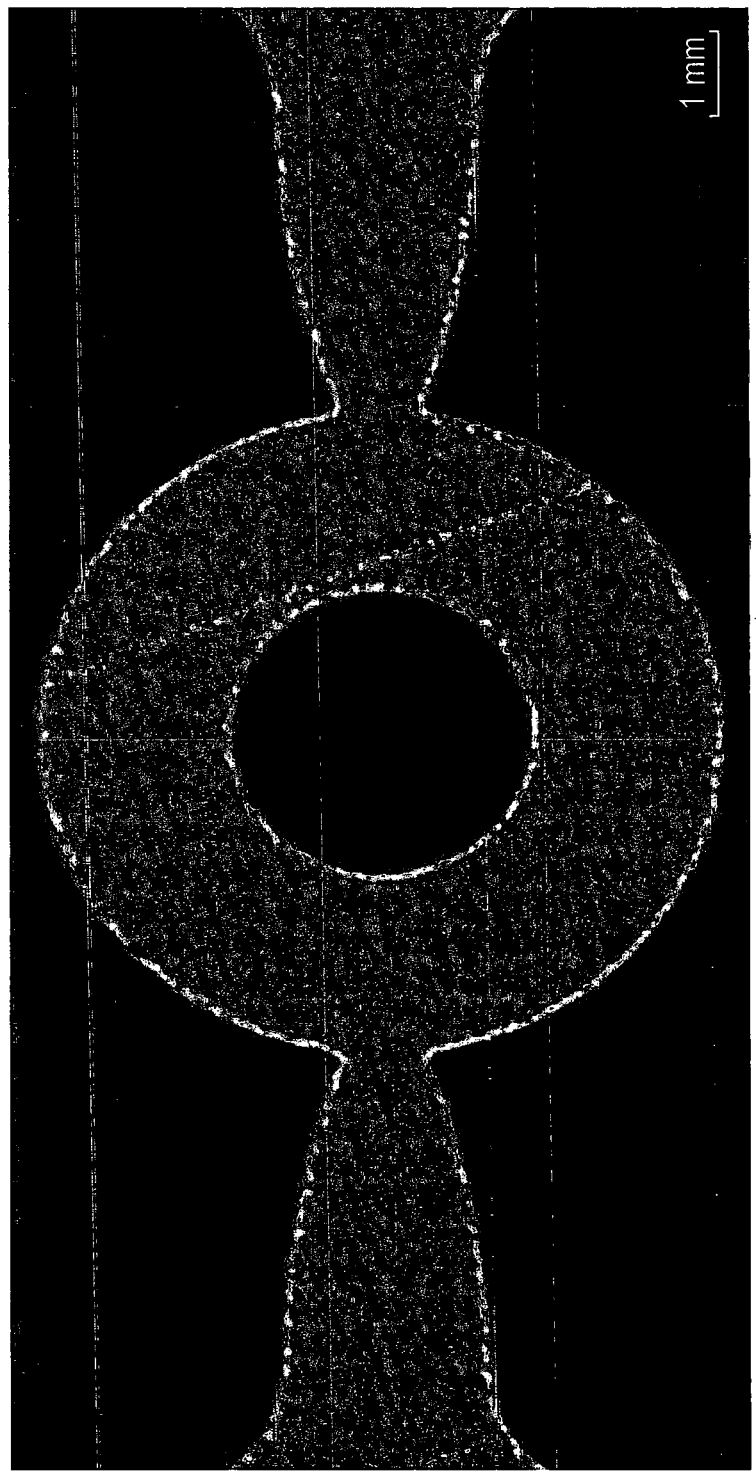
FIG. 5 is a two-dimensional visualisation of the sensor data shown in FIG. 4 based upon a two-dimensional spatial mapping having 40 micrometre pixels derived from summed sensor values with a Gaussian blur.

FIG. 5 illustrates a visualisation of the sensor data mapped to a cell-based mapping having a pixel size of 40 micrometres. Each pixel value is determined from the sensor data using an algorithm, as described in more detail below, which incorporates a Gaussian blur. This effectively spreads out the contribution of each sensor value to the surrounding pixels to provide a better representation of the regions of the layer that are effected by the laser melting process. The user may select the sigma, radius and a fine pixel size used in determining the Gaussian blur.

To determine the pixel values using the Gaussian blur, each sensor value is first assigned to a pixel of a fine pixel mesh having a pixel size less than that pixel size of the final two-dimensional mapping. In the representation shown in FIG. 5, the pixel size of the fine pixel mesh was 15 micrometres. Each pixel value for the fine mesh is determined by determining a scaled sum of the sensor values that fall within the pixel. The sum is scaled by dividing the sum of the sensor values by an expected number of sensor values for each fine pixel. The expected number of sensor values is the average number of sensor values for each fine pixel. A Gaussian blur is then applied to the pixels of the fine pixel mesh. The pixel values of the final two-dimensional mapping are then determined by taking a weighted average of the pixel values of the fine pixel mesh that fall within each larger pixel of the final two-dimensional mapping. The values are weighted by the proportion of each fine pixel that falls within the larger pixel. FIG. 5 shows sensor data to which a Gaussian blur having a sigma of 30 micrometres has been applied. As can be seen form FIG. 5, the sensor data has been spread out to provide a fairer representation of the coverage of the layer by the laser spot and the energy applied to different areas of the layer. However, hatch lines are still visible as the energy drops off as one moves away from a centre of a hatch line. Such a "meso" mapping of the sensor data may be useful in determining whether hatch lines overlap appropriately and the interaction of the hatch lines with other scan lines, such as border scans.

Figure 6:
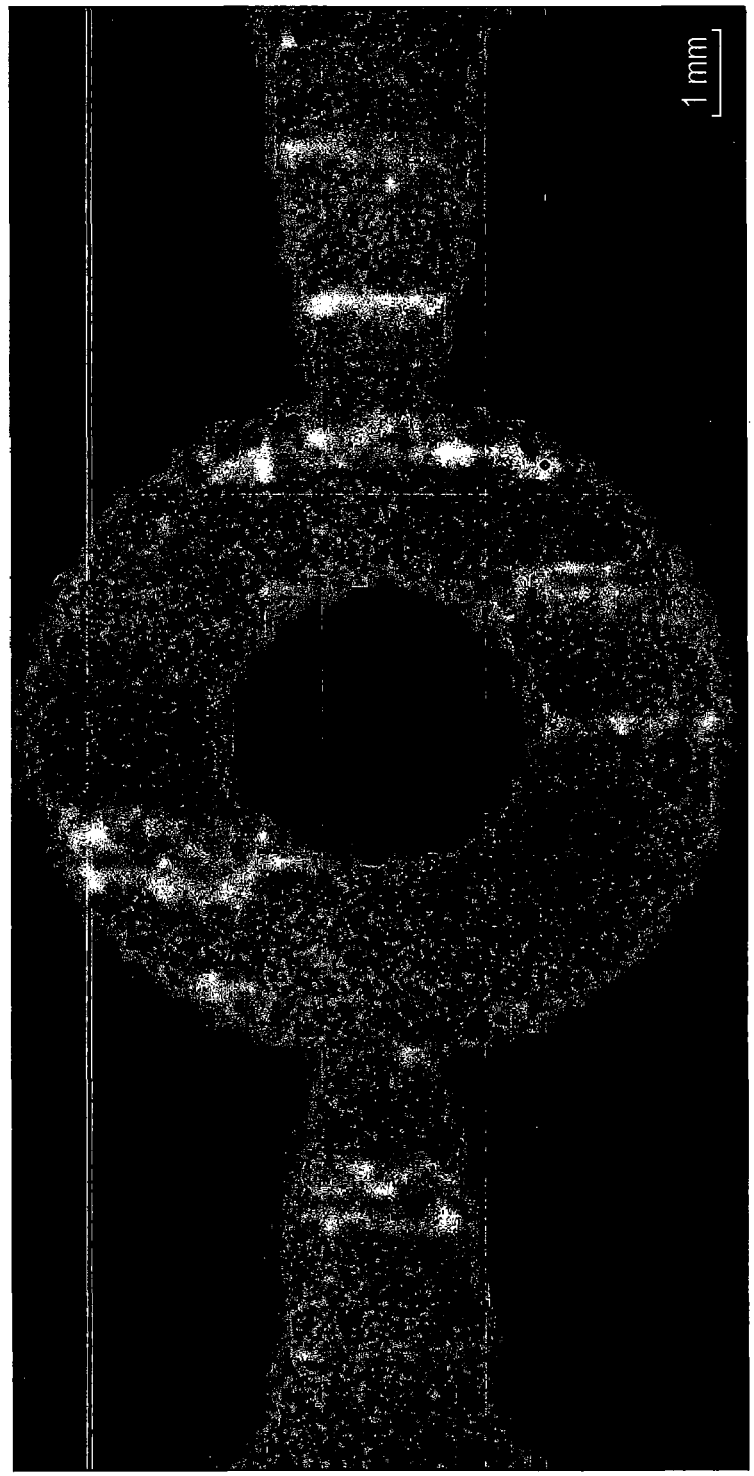
FIG. 6 is a two-dimensional visualisation of the sensor data shown in FIGS. 4 and 5 based upon a two-dimensional spatial mapping having 150 micrometre pixels using maximum values.

FIG. 6 illustrates a visualisation of the sensor data mapped to a cell-based mapping having a pixel size of 150 micrometres. Each pixel value is set as the maximum sensor value that falls within the pixel. Such a mapping may provide a fairer representation of the effect of the melt pool on the layer as the pixel size is comparable to the melt pool size. Use of the maximum value may allow a user to identify if there is any region which emitted unduly intense radiation during the process, for example due to overheating/vaporisation the powder. Applying a Gaussian blur or summation algorithm to the pixel value may obscure such anomalies. However, mappings having at a pixel size of 150 micrometres using summation of the sensor values with a Gaussian blur may be useful for determining if melt regions were generated covering all areas to be solidified and thus, whether unsolidified (porous) regions remain. A Gaussian blur (using an appropriate blur radius and sigma as determined from estimated melt pool dimensions) may be the preferred method of calculating a pixel value for a mapping to be used for this purpose as a summation otherwise fails to consider a contribution of an exposure falling just beyond an edge of a pixel.

In the above described embodiment, a contribution of each sensor value to a pixel value is independent of direction of the sensor value from a centre of the pixel or a time at which the sensor value was generated. However, the scanning process has directionality (both in terms of scan direction and hatch formation direction, D) and therefore, time dependence as the scan of the laser beam progresses across each layer. The algorithm used to determine the pixel values may take these factors into account. For example, the blur may use a normal distribution skewed based upon a direction of the scan and/or hatch formation direction.

The visualisation apparatus 202a, 202b, 202c may also be arranged to generate a volumetric mapping of the sensor data. In this embodiment, the volumetric mapping is generated from a plurality of pixel maps, for example as described above, corresponding to layers of the additive manufacturing process. The sensor data may be sent to the visualisation apparatus 202a, 202b, 202c in packets or batches, each containing sensor data for a layer. On receipt of each packet of sensor data, a two-dimensional map is formed for the layer as described above.

After the receipt of sensor data for a predetermined number of layers having a combined thickness corresponding to a depth of a melt pool, voxel values are calculated from the pixel values of the two-dimensional maps generated for that sensor data. The voxel values for the volumetric mapping may be determined by summing together all pixels that fall within a volume represented by the voxel, or by determining a mean value for all pixels that fall within that volume.

Alternatively, a blurring algorithm may be applied in the determination of the voxel values. In this latter case, the voxels may have a size smaller than the melt pool or even the same as a thickness of a layer but the voxel values are determined from sensor or pixel values for a plurality of different layers. As a melt pool is formed across many layers of the powder bed, sensor values captured for melt pools generated for multiple different layers may contribute to a voxel value. However, the sensor values that can contribute to a voxel value may be confined to those for layers intersecting the voxel and, optionally, a predetermined number of layers above the voxel. The predetermined number of layers may be based upon an expected melt pool depth. Accordingly, blurring for the volumetric model may also have directionality such that sensor data for lower layers does not provide a contribution to the voxel value.

This volumetric model may be determined and displayed in real-time on the visualisation apparatus 202a, 202b, 202c as sensor data is received during the additive manufacturing process.

In another embodiment, the pixel values for the two-dimensional mapping may be determined based upon sensor values generated for multiple different layers, such as sensor data for the predetermined number of layers above the layer being mapped.

In the embodiments in which the cell values of the mapping are dependent on sensor values collected for subsequent layers, a plurality of spatial maps may be generated for a particular layer or volume for different times during the build. Accordingly, the user could view a mapping of the sensor data for layer 1 after layer 1 has been formed but also after layers 2, 3, etc have been formed. These spatial maps may be displayed as an animation allowing the user to view how the pixel/voxel values change with time during the build.

Furthermore, a directionality or weighting applied to sensor values for the blurring for a voxel value may vary dependent on the time during the build represented by the mapping. For example, a weighting given to a sensor/pixel value of a layer may be given greatest weighting (such as 100% weighting) when determining a voxel/pixel value corresponding to a mapping representing at time just after formation of that layer but may be given a lesser weighting for mappings representing a time after the formation of later layers.

It is envisaged that the spatial mappings described above may also be used in a computer implemented process, such as closed loop control of additive manufacturing apparatus. As such, rather than the determination of the spatial mappings being carried out in a visualisation apparatus remote from the additive manufacturing apparatus, the controller of the additive manufacturing apparatus may be arranged to determine and analyse the spatial mappings. A setpoint value may be determined for the pixel values as determined in accordance with the method described with reference to FIG. 5 for a photodiode detecting the radiation collected through the optical module and the scanning parameters, such as laser power, may be controlled to obtain/return the process to a norm in which the pixel values match the setpoint value. The in-process control loop may comprise a low pass filter applied to an output of the sensor values having a cosine window with a width comparable to a dimension of the melt pool or laser spot.

Example

Figure 7A:
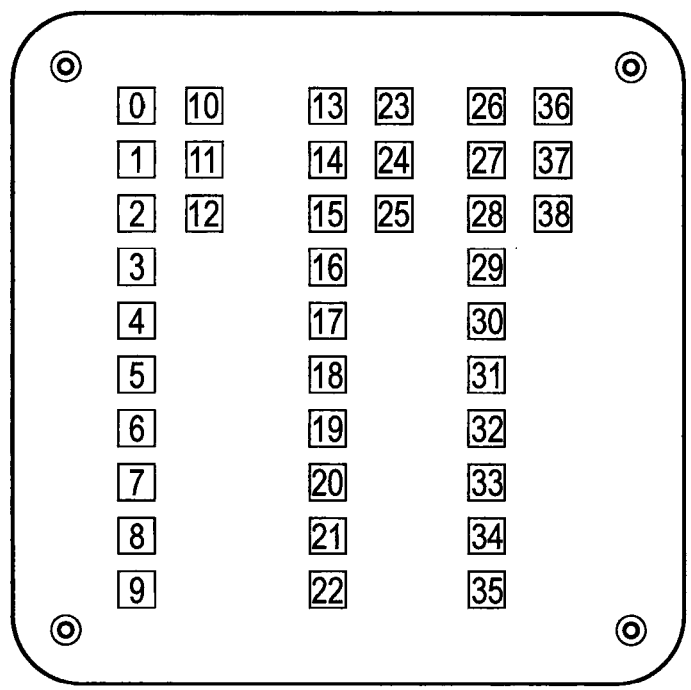
FIG. 7a shows the positions of 39 test parts built using additive manufacturing.

A series of test parts (each comprising a cube shape built on the top of an inverted pyramid) were built in a single build from Inconel 718 using a Renishaw RenAM™ 500 M additive manufacturing machine, wherein 13 different combinations of scanning parameters were used. Each set of scanning parameters was used three times at different locations on the bed. The layer thickness was 60 micrometres. FIG. 7a shows the locations on the bed for the test parts and FIG. 7b shows the parameter set used for each test part.

Figure 8:
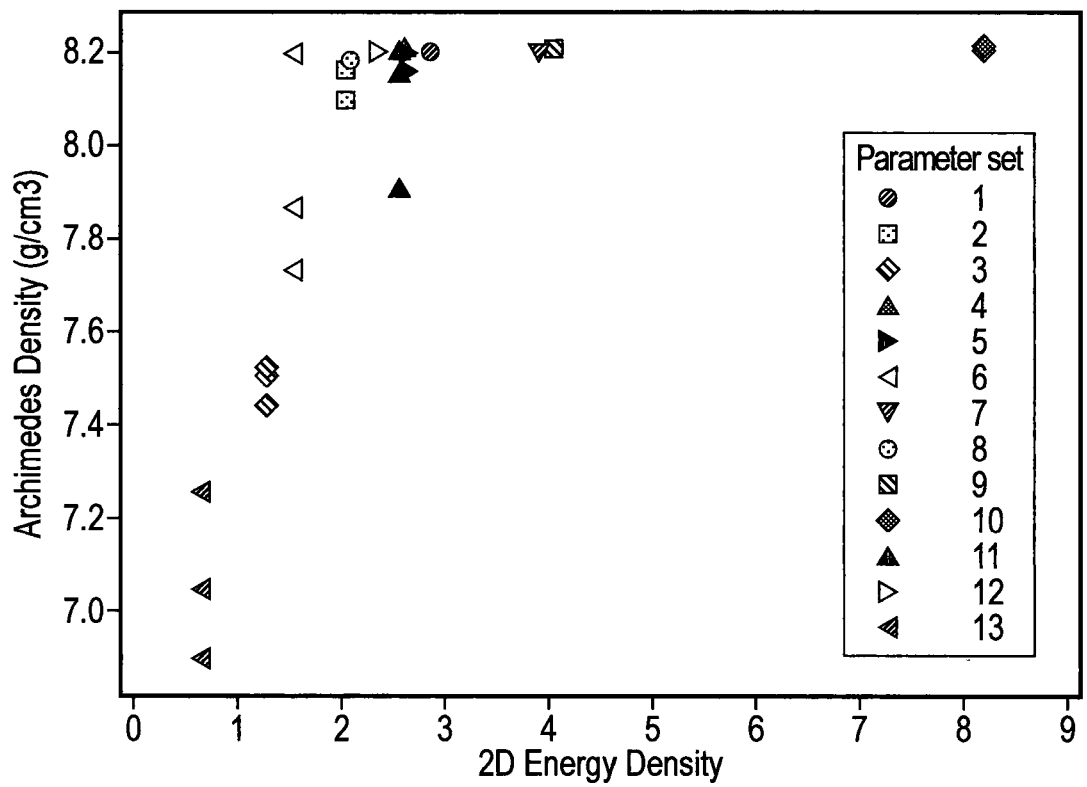
FIG. 8 is a graph of density of each part measured using an Archimedes method plotted against 2D energy density for each parameter set.

FIG. 8 shows the density of the parts as measured using an Archimedes method plotted against 2D energy density as determined from the parameter sets. As can be seen from the graph, parameter sets 3, 6 and 13 produce parts having a density that is significantly less than fully dense and parameter sets 2 and 8 produce parts that are on the cusp of being fully dense. From this graph, it also appears that one of the parts produced using parameter set 4 is not fully dense. However, a density of this part was rechecked and it was found to be substantially fully dense.

Figure 9:
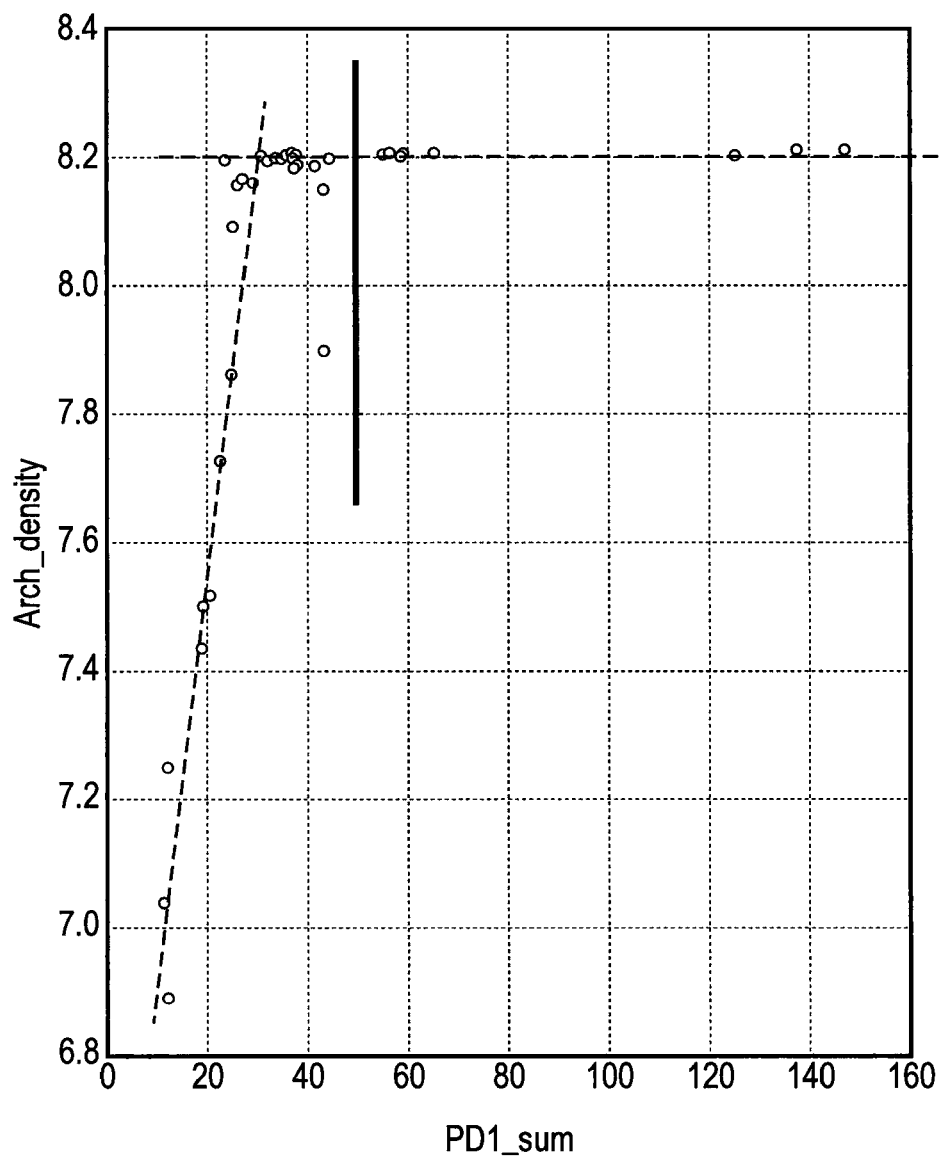
FIG. 9 is a graph of the density of each test part against the mean pixel value, wherein each pixel value is derived from summed sensor values with a Gaussian blur (hereinafter referred to as the "Summed Pixel Value") determined using the method described below with reference to FIG. 5.

FIG. 9 shows the density of the parts plotted against the mean of the Summed Pixel Values for an integrating photodetector arranged to detect radiation having a wavelength between 700 nm and 1000 nm. The pixel size was 40 micrometres. As can be seen from the graph, the Summed Pixel Values correlate with the density of the parts.

Figure 10:
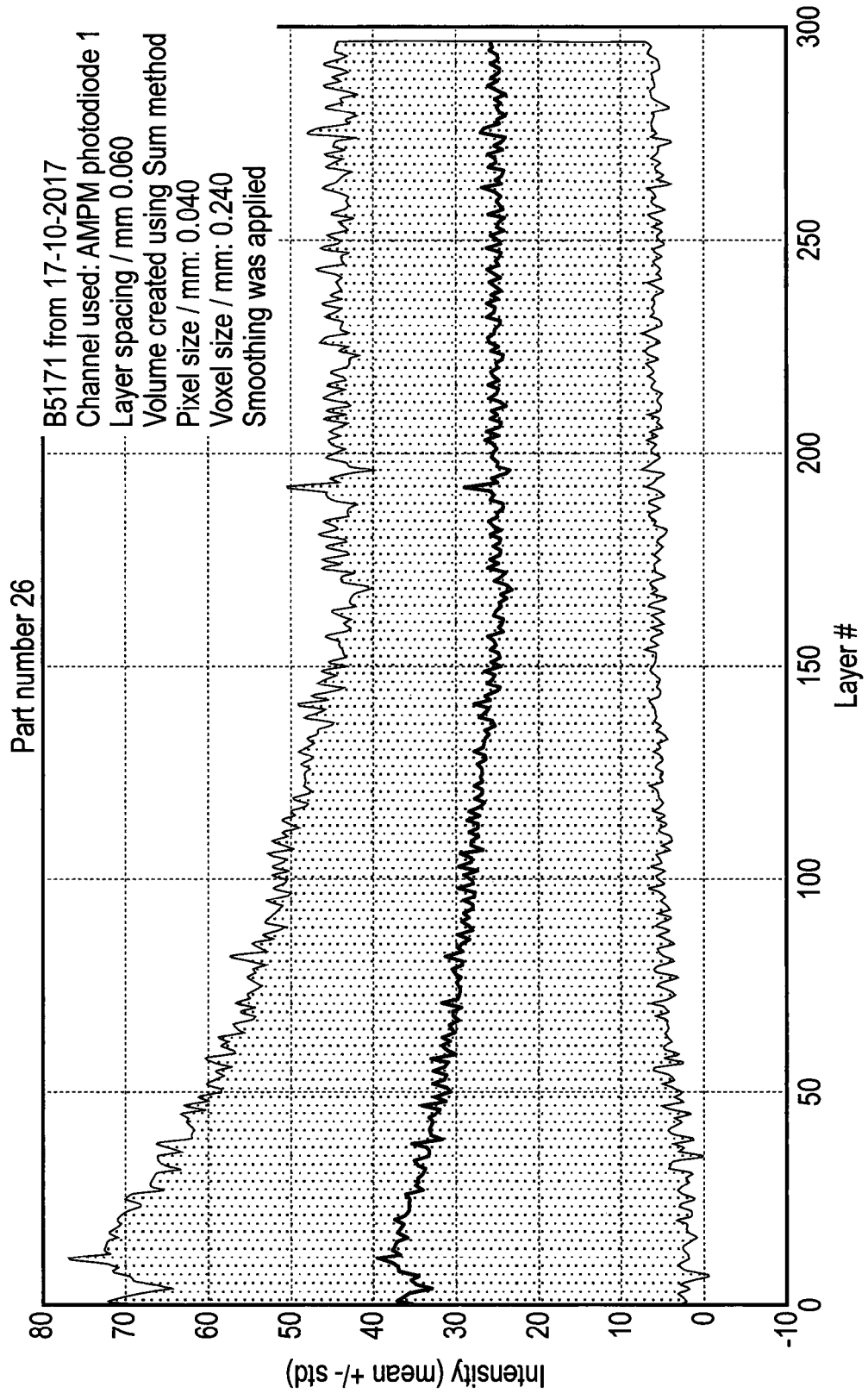
FIG. 10 is a graph of the mean and standard deviation for the Summed Pixel Values for each layer of part number 26, which was measured as having a density that is 98.5% of the theoretical density.

FIG. 10 shows the variation in the mean and the standard deviation for the Summed Pixel Value on a per layer basis for part 26, which was measured to have a density of 98.5% of theoretical density. Typically, additive manufacturing apparatus are optimised to provide higher densities, such as densities at least above 99.5% of the theoretical density. The mean value for the Summed Pixel Values is generally between 25 and 40. The standard deviation in the Summed Pixel Values settles down after about 150 layers to about 20 intensity units. This settling of the sensor values coincides with the termination of the inverted pyramid section of the part, which ends on the $167^{th}$ layer.

Figure 11:
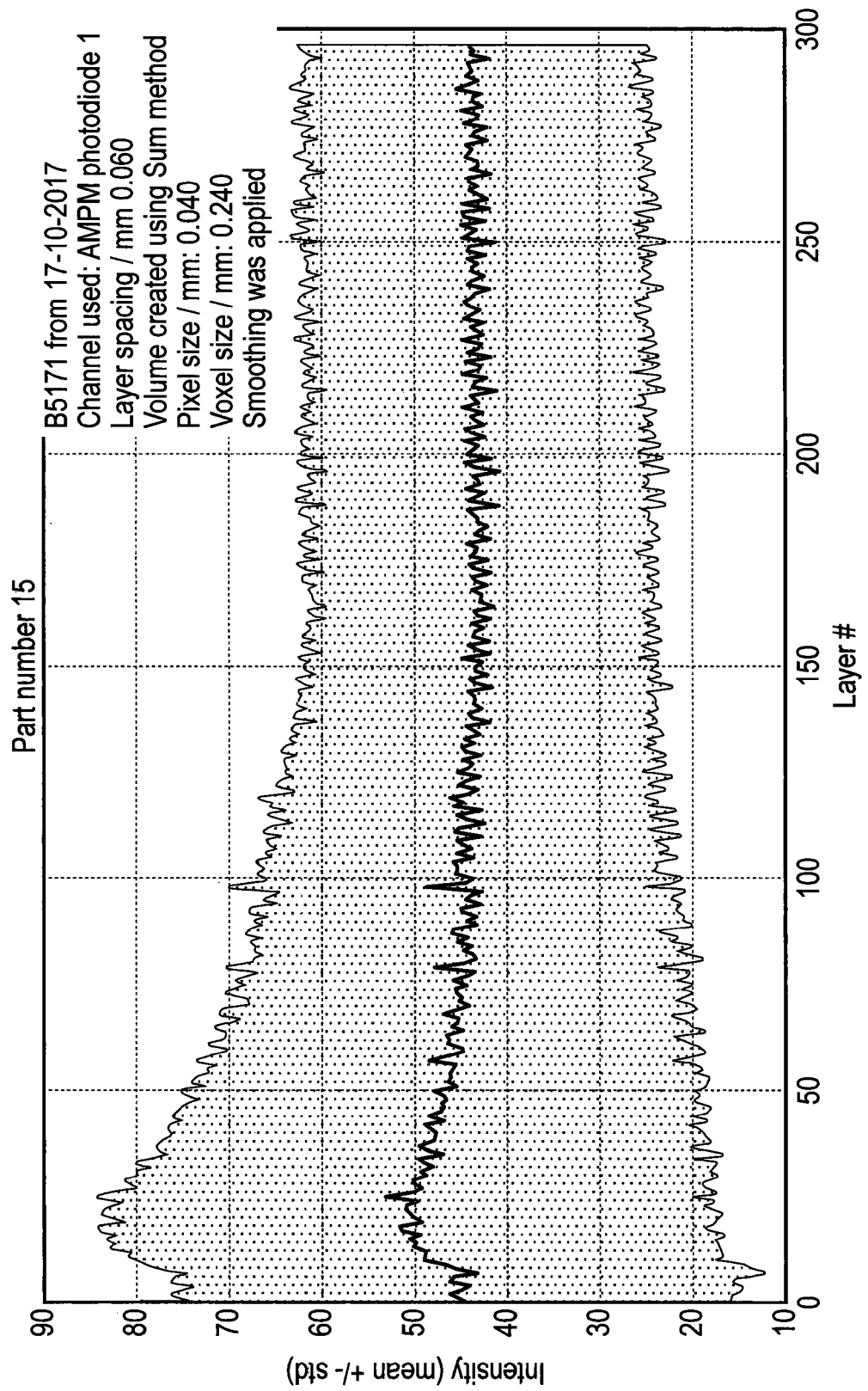
FIG. 11 is a graph of the mean and standard deviation for the Summed Pixel Values for each layer of part number 15, which was measured as having a density that is 96.2% of the theoretical density.

FIG. 11 shows the variation in the mean and the standard deviation for the Summed Pixel Values on a per layer basis for part 15, which was measured to have a density of 96.2% of theoretical density. The mean value is generally between 40 and 50. The standard deviation in the Summed Pixel Values again settles down after about 150 layers to about 20 intensity units.

Figure 12:
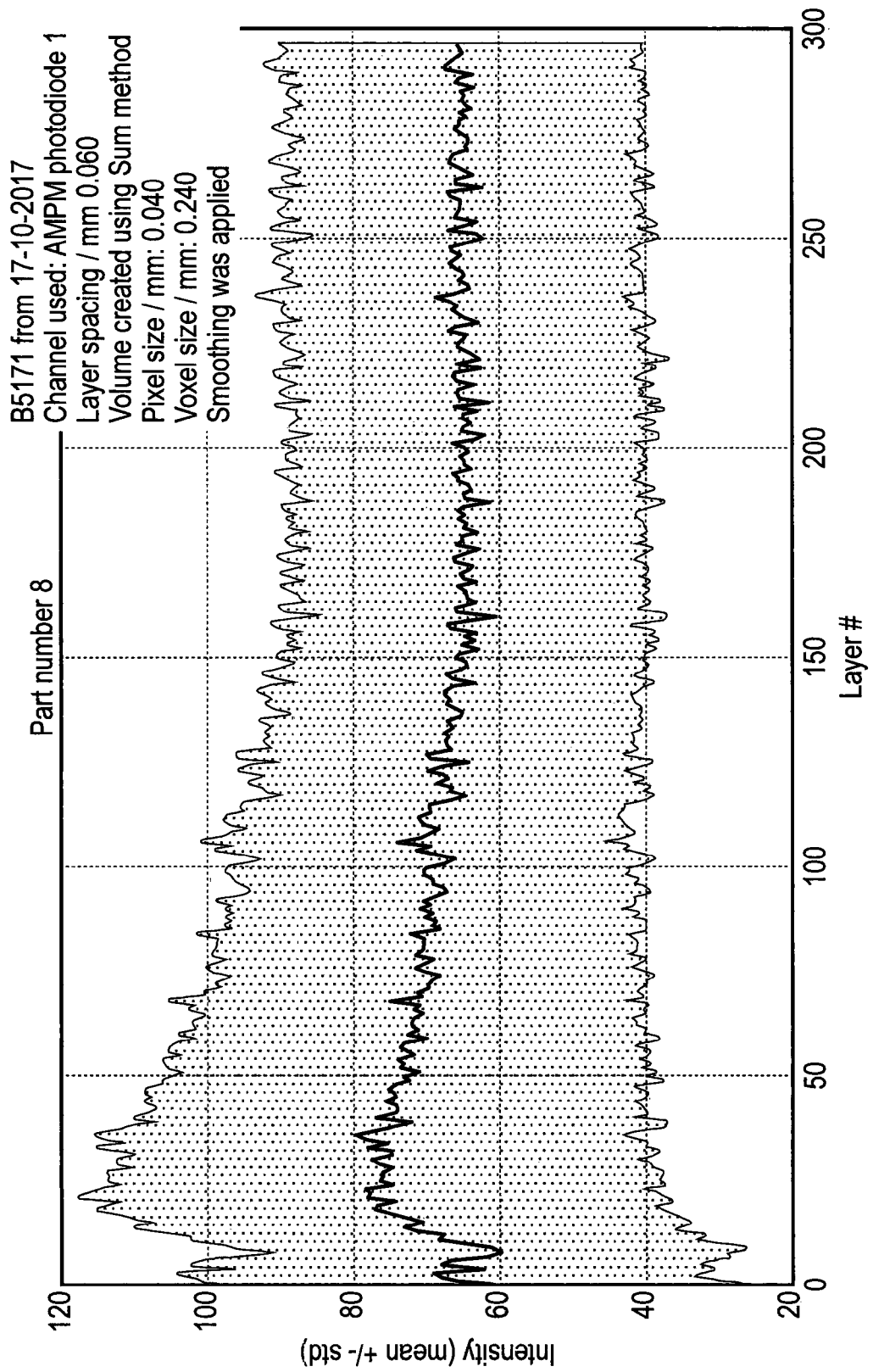
FIG. 12 is a graph of the mean and standard deviation for the Summed Pixel Values for each layer of part number 8, which was measured as having a density that is 99.9% of the theoretical density.

FIG. 12 shows the variation in the mean and the standard deviation for the Summed Pixel Value on a per layer basis for part 8, which was measured to have a density of 99.9% of theoretical density. The mean value is generally between 60 and 80. The standard deviation in the Summed Pixel Values again settles down after about 150 layers to about 20 to 25 intensity units.

Accordingly, it is believed that there is sufficient difference between the Summed Pixel Values for "bad" parts and "good" parts and small enough variation within a part such that these values can be used as a process variable for a control loop in which a setpoint value is defined for the Summed Pixel value.

It is believed that other sensor data could be used for feedback control of the process. For example, Summed Pixel Values for a photodiode detecting radiation having wavelengths of above 1000 nm.

Further factors may be taken into account when determining a setpoint value. For example, a direction of a scan and a position of a scan in the working plane.

Figure 13:
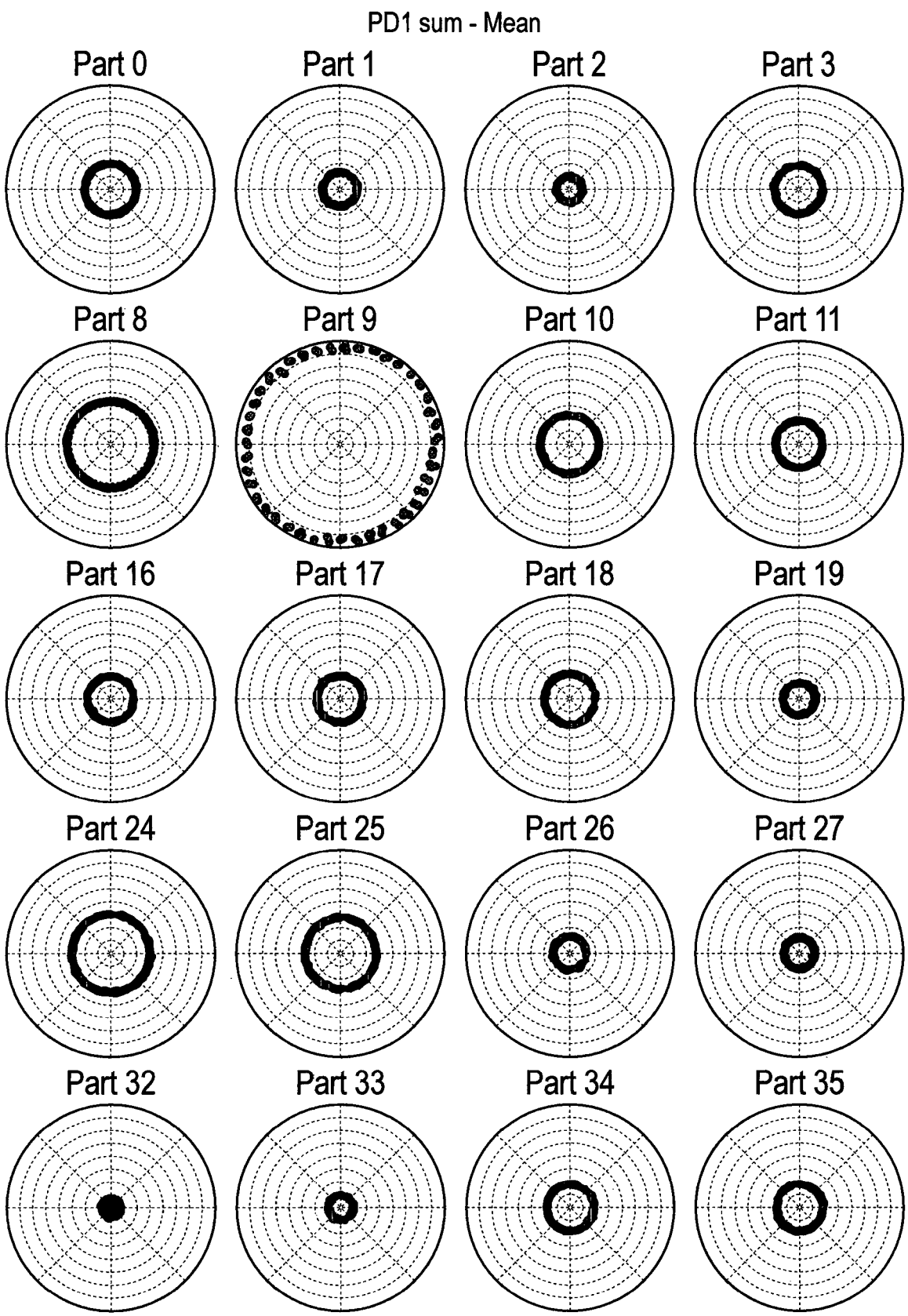
FIG. 13 shows a series of polar plots of the mean Summed Pixel Value for each part for different scanning directions.
Figure 13:
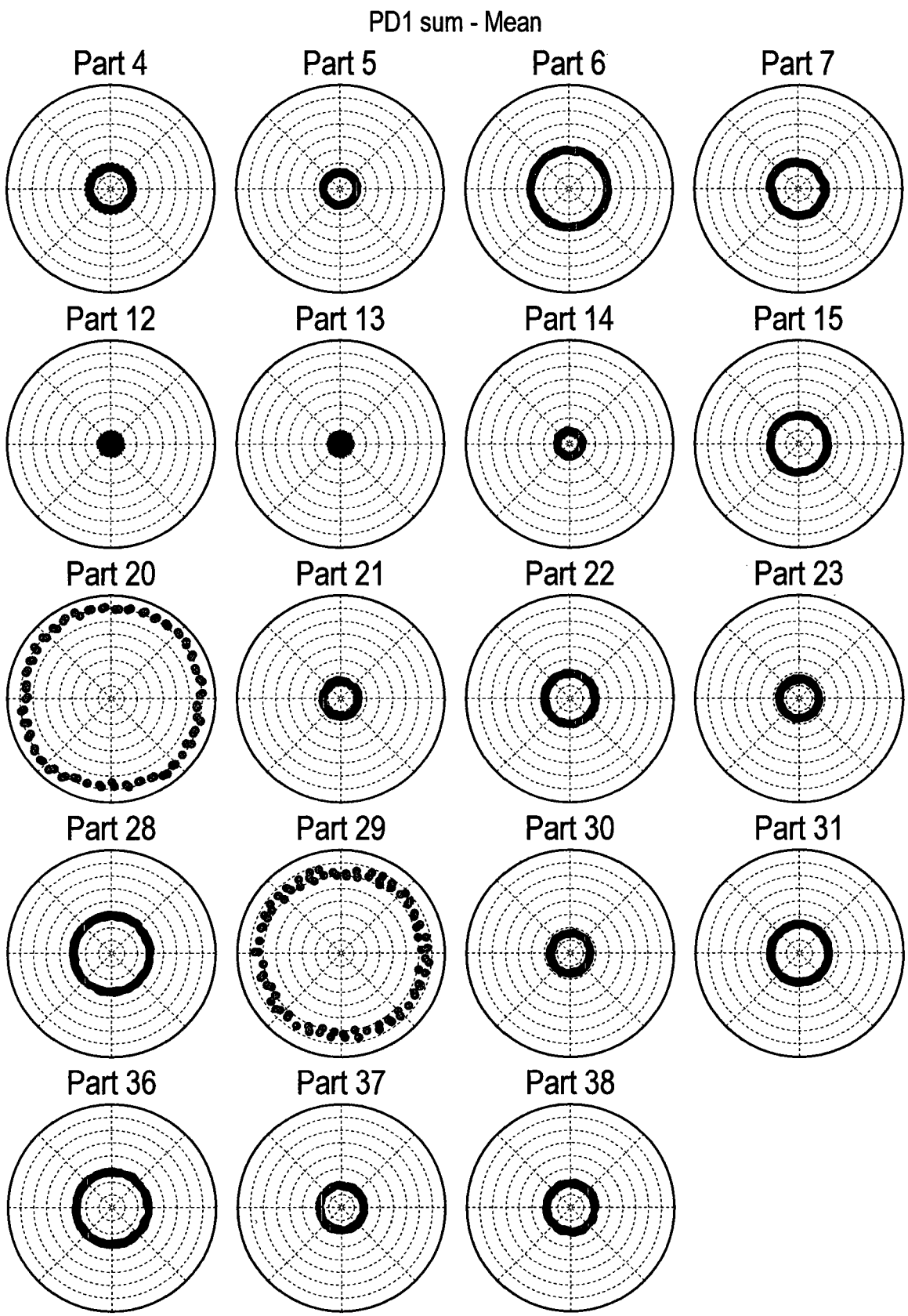
Figure 14:
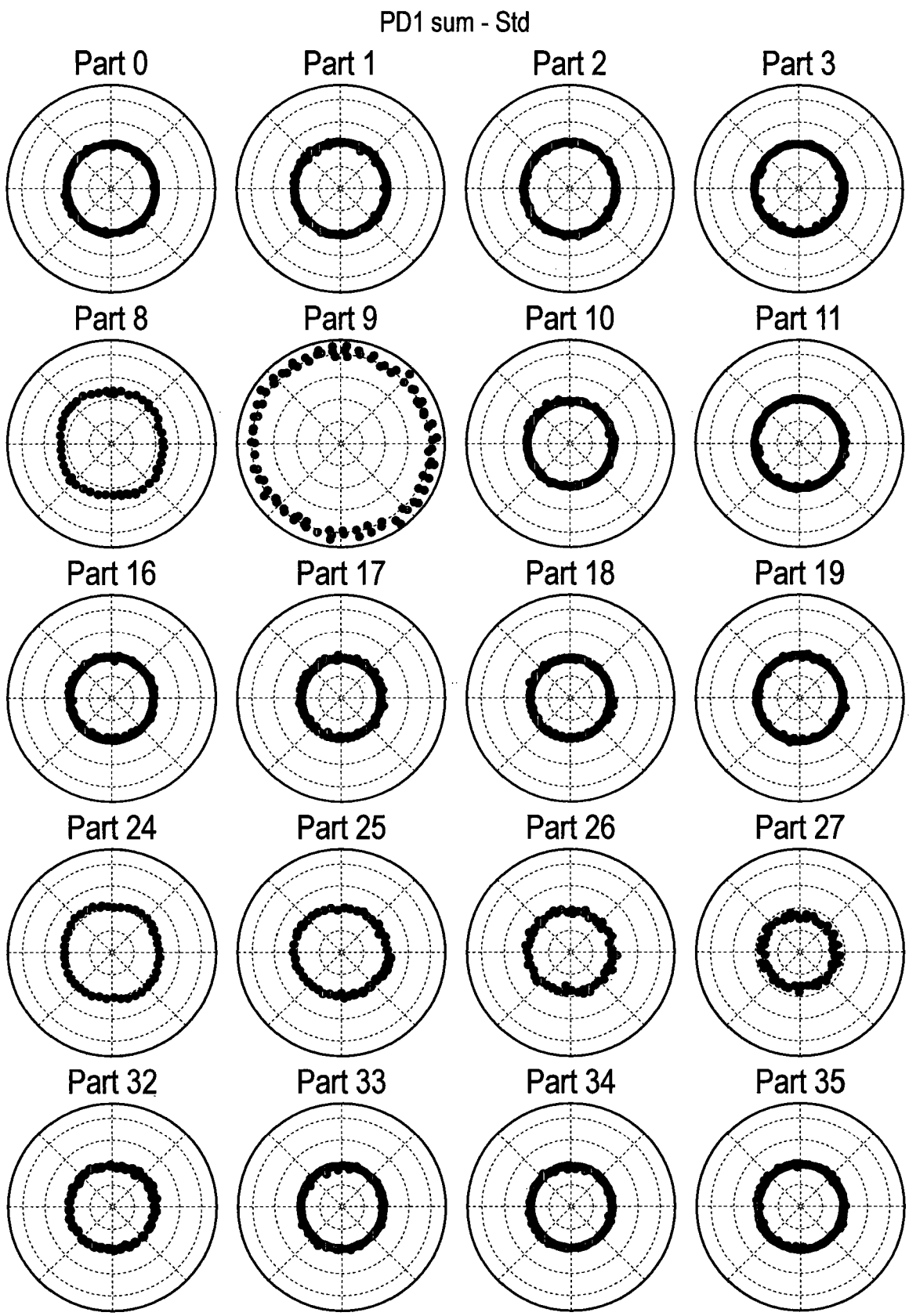
FIG. 14 shows a series of polar plots of the standard deviation of the Summed Pixel Values for each part for different scanning directions.
Figure 14:
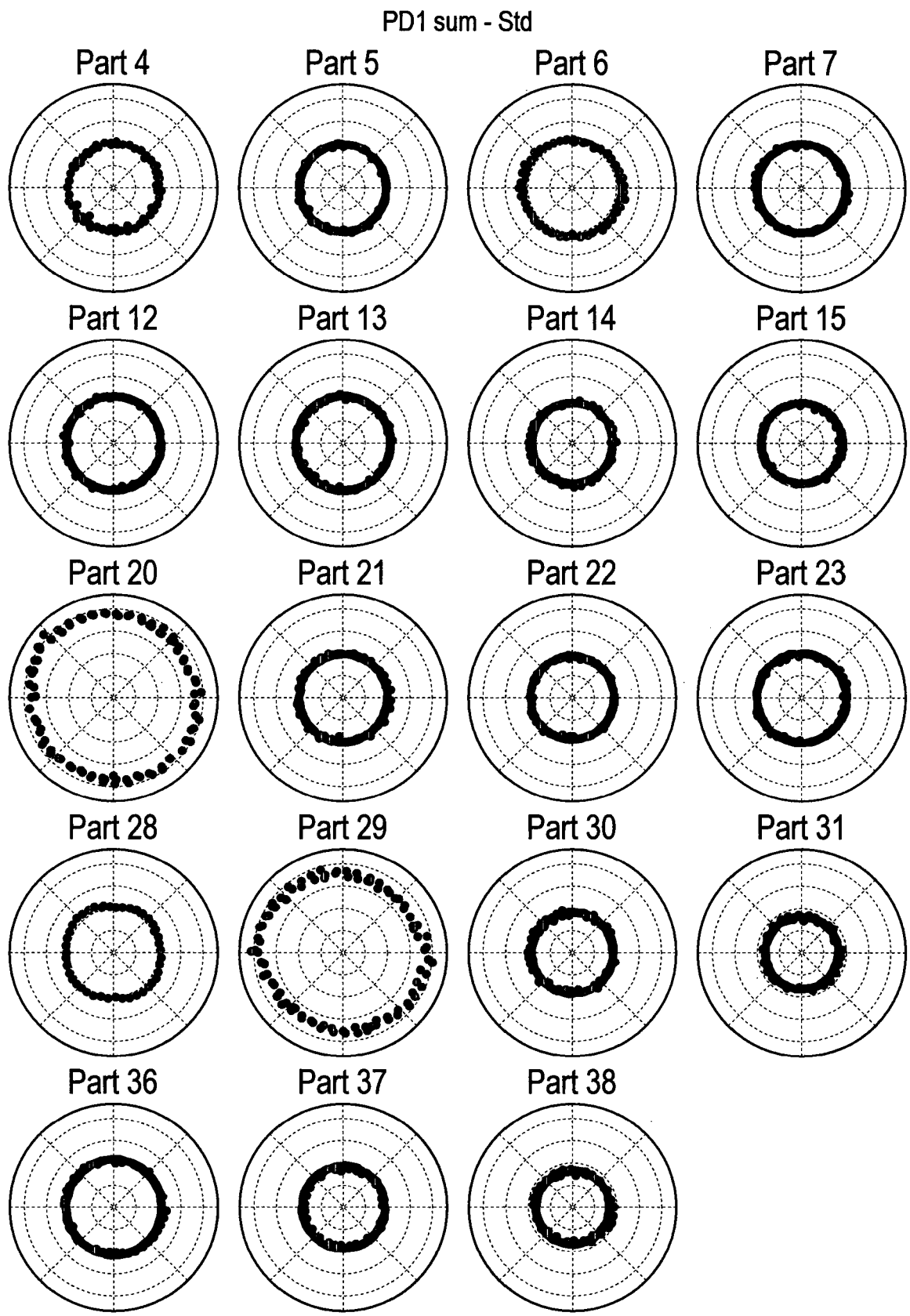

FIG. 13 is a series of polar plots showing the variation of the mean value of the Summed Pixel Values for different scan directions for each part. As can be seen from the plots, the variation in mean value between parts is more significant than any variation with scan direction. However, there is some small variation with scan direction. FIG. 14 shows that the standard deviation in the Summed Pixel Values does not vary significantly between parts and with scanning direction, with the exception of parts 9, 20 and 29 scanned with parameter set 10 (which achieves a very high energy density). Accordingly, this suggests variation of a setpoint value with scan direction is not required. However, in one embodiment, a setpoint value may be selected based upon the scan direction, for example selected from a plurality of setpoint values, each determined for a different scan direction.

Figure 15:
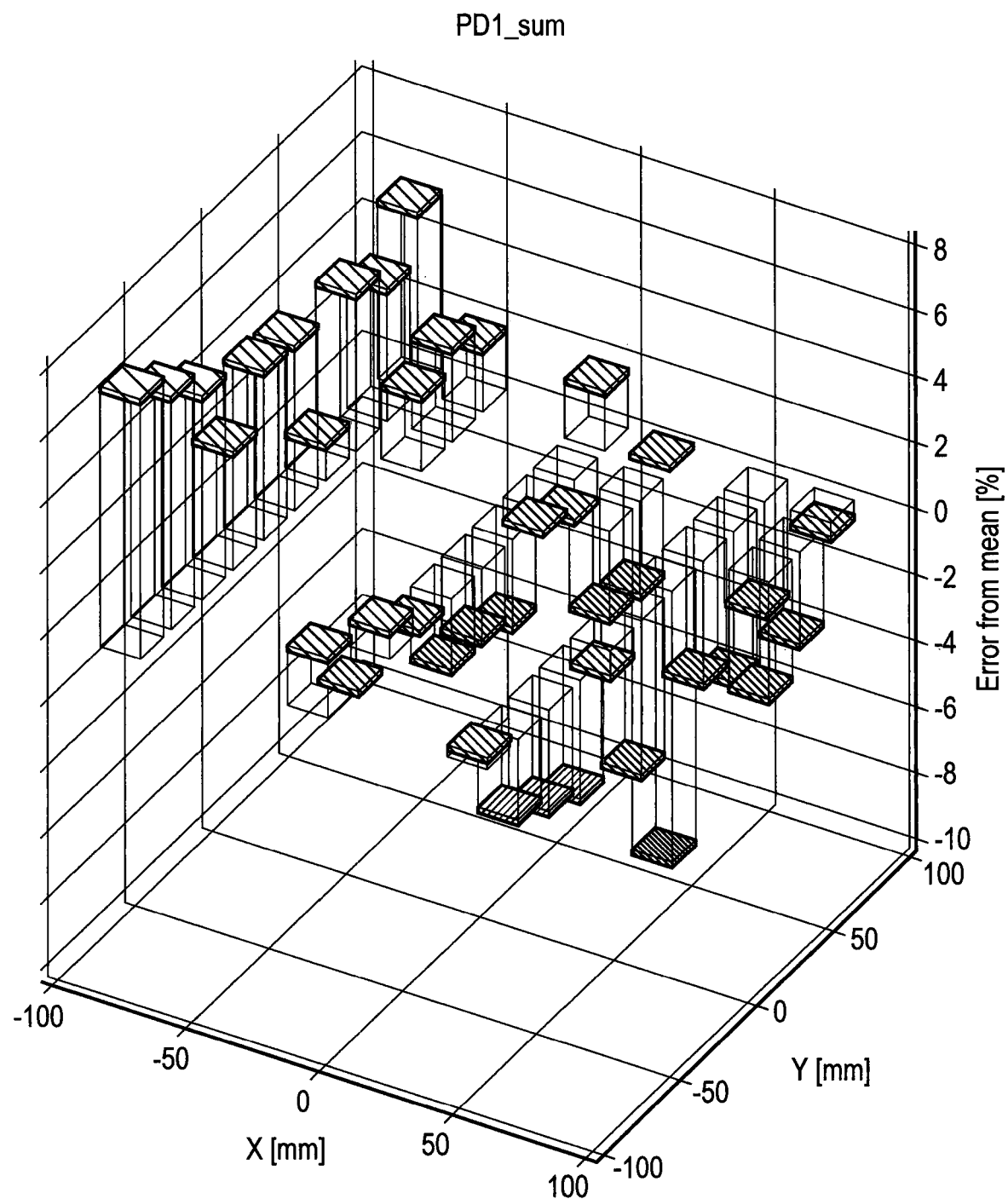
FIG. 15 shows a variation of the mean of the Summed Pixel Value with position of the part in the powder bed.

The variation in the mean value of the Summed Pixel Values with position in the working plane is illustrated by FIG. 15. FIG. 15 shows the percentage variation of the mean value for the Summed Pixel Values from a mean calculated for each parameter set (a total of 13 parameters sets were used with each being repeated 3 times). During the build, a gas knife was generated from a gas nozzle to a gas exhaust in the x-direction from +x to −x. As can be seen from FIG. 15, the parts closer to the gas nozzle have Summed Pixel Values lower than the mean for that parameter set whereas parts closer to the gas exhaust have Summed Pixel Values higher than the mean for that parameter set. Accordingly, this suggests that a desired mean value for the Summed Pixel Value will vary with a location of a scan in a working plane. Accordingly, the setpoint value may be calibrated for different locations of a scan within the working plane and, during closed loop control, the setpoint value altered accordingly based upon a location of a scan.

It is believed that the Summed Pixel Value provides a better representation of the physical effects detected by the sensor and therefore, the Summed Pixel Values provides a better basis for in-process control.

The invention is not limited to generating a spatial mapping from sensor data collected during a single build but may generate a spatial mapping from sensor data generated during multiple nominally identical builds. Each cell value of the spatial mapping may be generated from a plurality of sensor values generated across the plurality of builds. For example, the sensor values used to create the spatial mapping may be values generated from builds that have been verified as "good" builds by appropriate post-testing of the manufactured objects. The cell values may be generated using the Summed Pixel Value technique as described above, but when applied to the sensor values generated during the good builds. Spatial mappings may be generated for multiple statistical measurements, such as a mean of the sensor values, standard deviation of the sensor values, sum of the sensor values and/or inter-quartile range for the multiple "good" builds.

A spatial mapping for a subsequent nominally identical build can then be compared to the spatial mapping(s) generated for the multiple builds on a cell by cell basis to determine if the cell values for the subsequent build fall within the expected cell values for a good build. In this way, the comparison takes account of expected variations in the sensor values with, for example, position in the build, scan direction and changes in the scan parameters during the build. Such variations may be build specific being dependent on geometry of the object and the build design. This may provide a more sensitive method for determining whether an object has been formed within or outside a defined specification compared to comparing all cell values to a global allowable range for the cell values.

The results of the comparison may be used to verify the build/the object. If it is determined that one or more cell values are not within the expected values, the object may be sent for further testing, processing and/or may be discarded. In the case of there being multiple spatial mappings for good builds based on multiple statistical measures, the results of the comparison may be visualised, for example by colour coding a representation of the object, to identify which statistical measure has been failed at which location on the subsequent build. This visualisation may be used by a user to assess whether the build/object meets a specification. The comparison may be used as the basis for generation of an alert if cell values generated from the sensor values fall outside the expected cell values as determined through the spatial mapping.

Rather than generating the spatial mapping for multiple builds, a single spatial mapping may be generated from sensor values collected for multiple nominally identical objects whether they are all built in a single build or across multiple builds.

Furthermore, the multi-build spatial mapping may be determined from multiple nominally identical builds in the same machine. The expected variation in cell values for a spatial mapping created from sensor values from a single machine may be less than what would be expected across multiple machines, for example because the sensor response across different machines may not have been normalised. Hence, a variation in sensor values collected across multiple machines may not represent a variation in the build but may represent a variation in a response of the sensors. This problem may be overcome by spatially mapping z-scores (standard scores) for the cell values or other suitable statistical normalisation of the cell values between different machines.

The spatial mapping generated from multiple builds and/or multiple objects may be generated from only a portion of the sensor values generated for the builds/objects. For example, through appropriate analysis of the build or object it may be possible to identify "good" portions of the build/object (i.e. portions of the build/object that meet a specification as determined, for example as determined by a CT scan of other non-destructive (NDT) or even destructive testing (DT) method) and "bad" portions of the build/objection (i.e. portions of the build/object that do not meet the specification). The spatial mapping may be generated from the sensor values generated only for the "good" portions of the builds/objects. In this way. even a portion of the sensor data generated during a bad build can be aggregated in the spatial mapping to provide a benchmark for the cell values of later spatial mappings for nominally identical builds/builds of nominally identical objects. Types of testing that may be carried out to determine whether a build or object is a "good" of "bad" build/object is disclosed in WO2017/085468, which is incorporated herein by reference.

It will be understood that modifications and alterations may be made to the above described embodiments without departing from the invention as defined in the claims.

The invention claimed is:

1. A method of valuating an additive manufacturing process, in which a plurality of layers of powder are selectively melted with an energy beam to form an object, the method comprising:
receiving sensor data collected during the additive manufacturing of the object, the sensor data comprising sensor values captured for different coordinate locations of the energy beam during the additive manufacturing of the object;
generating cell values for cells of a spatial mapping of the sensor data, the cells corresponding to one of pixels and voxels of the spatial mapping,
wherein the cell value for each cell is determined from a respective plurality of the sensor values including at least one sensor value captured for a coordinate location that is beyond a spatial extent of the cell; and
determining defects in the object from the spatial mapping.

2. A method according to claim 1, wherein the respective plurality of sensor values are attributed to coordinate locations extending over an area/volume having a dimension of between 65 microns and 500 microns.

3. A method according to claim 1, wherein each cell represents a spatial extent comparable to the size of the melt pool or the energy beam spot.

4. A method according to claim 1, wherein each cell has a spatial extent significantly smaller than the size of the melt pool and/or the energy beam spot but whose value is determined from a respective plurality of the sensor values extending over the area/volume comparable to the melt pool or the energy beam spot.

5. A method according to claim 1, wherein each cell value is determined from sensor values from different ones of the plurality of layers.

6. A method according to claim 1, wherein determining each cell value comprises a weighted summation of the respective plurality of sensor values based upon a distance of the corresponding coordinate location for each sensor value from a cell location of the cell.

7. A method according to claim 1, wherein determining cell values comprises a blurring to smooth the sensor values out among the cells of the spatial mapping.

8. A method according to claim 1, wherein the plurality of sensor values used for the generation of the cell value or the algorithm used to generate the cell value is based upon directionality of a scan and/or a time of capture of the sensor values during the additive manufacturing process.

9. A method according to claim 1, wherein each cell has a corresponding cell location and the respective plurality of sensor values are within a defined distance of the cell location, the defined distance extending beyond a spatial extent of the cell.

10. A method according to claim 1, wherein the spatial mapping is a volumetric model of the sensor values and a voxel size of the volumetric model is greater than a thickness of a layer in the additive manufacturing process.

11. A method according to claim 1, wherein, the sensor data comprises at least one selected from the group of:

i) sensor values derived from radiation emitted from melted regions and/or plasma generated during the additive manufacturing process; and
ii) sensor values derived from a beam monitoring sensor.

12. A method of controlling an additive manufacturing process, in which a plurality of layers of powder are selectively melted with an energy beam, the method comprising:
receiving sensor data collected during the additive manufacturing of the object, the sensor data comprising sensor values captured for different coordinate locations of the energy beam during the additive manufacturing of the object;
generating cell values for cells of a spatial mapping of the sensor data, the cells corresponding to one of pixels and voxels of the spatial mapping,
wherein the cell value for each cell is determined from a respective plurality of the sensor values including at least one sensor value captured for a coordinate location that is beyond a spatial extent of the cell;
comparing one or more of the cell values to a target value or range; and
controlling the additive manufacturing process based upon the comparison.

13. A method according to claim 12, wherein the target value or range is determined from an average cell value for sensor data generated when producing one or more test parts having a required/target density.

14. A method according to claim 12, comprising carrying out closed loop control during the additive manufacturing based upon the comparison of the one or more cell values to the target cell value or range.

15. A method according to claim 12, wherein controlling the additive manufacturing process comprises adjusting at least one scanning parameter.

16. A method according to claim 12, comprising comparing an aggregation of cell values to the target value or range.

17. A method of controlling an additive manufacturing process, in which layers of powder are selectively melted with a laser beam to form an object, the laser beam steered onto the powder by movable mirrors of a scanner, the method comprising:
receiving sensor data collected during the additive manufacturing of the object, the sensor data comprising sensor values generated by a sensor for detecting radiation emitted from a region of melted powder and then reflected onto the sensor by the movable mirrors used for steering the laser beam onto the powder, each sensor value attributed to a different coordinate location of the laser beam during the additive manufacturing of the object based upon a measured mirror position or a demand position for the movable mirrors at a time the sensor value is generated;
selecting a plurality of the sensor values that fall within a specified spatial window or captured during a specified temporal window;
generating a process value representative of a state of progression of the additive manufacturing process for a process value location or time, the process value generated from the selected plurality of the sensor values;
comparing the process value to a setpoint value; and
adjusting the additive manufacturing process based upon the comparison.

18. A method according to claim 17, wherein the selected plurality of sensor values extend over an area/volume comparable to an extent of the melt pool or the energy beam spot.

19. A method according to claim 17, wherein the process value is determined from a weighted sum of the selected plurality of sensor values, a weighting determined from the coordinate locations or times of capture of the selected plurality of sensor values.

20. A method according to claim 17, comprising determining a process value for a process value location within a layer, the process value determined by summing the selected plurality of sensor values based upon a distance of a coordinate location for each sensor value from the process value location.

21. A method according to claim 17, wherein adjusting the additive manufacturing process comprises adjusting parameters of an additive manufacturing apparatus during manufacture of the object.

22. A method according to claim 17, wherein adjusting the additive manufacturing process comprises adjusting parameters of the additive manufacturing process for manufacture of a further object using the additive manufacturing process.

23. A data carrier having instructions stored thereon, wherein the instructions, when executed by a processor cause the processor to carry out the method of claim 1.

24. A method according to claim 9, comprising receiving a user/operator input defining the defined distance and determining the respective plurality of sensor values to use in determining the cell value based upon the user/operator input.

25. A method according to claim 9, wherein the defined distance is between 65 microns and 500 microns.

26. A method according to claim 11, wherein the sensor data comprises sensor values captured by photodiodes or cameras arranged to view the melted region through an optical train used to deliver a laser beam.

27. A method according to claim 11, wherein the sensor values are derived from a photodiode monitoring the laser beam.

28. A method according to claim 27, wherein the sensor values are a measurement of energy beam power.

29. A method according to claim 27, wherein the sensor values are a measurement of energy beam modulation.

30. A method of monitoring an additive manufacturing process, in which a plurality of layers of powder are selectively melted with an energy beam to form an object, the method comprising:
receiving sensor data collected during the additive manufacturing of the object, the sensor data comprising sensor values captured for different coordinate locations of the energy beam during the additive manufacturing of the object;
generating cell values for cells of a spatial mapping of the sensor data, the cells corresponding to one of pixels and voxels of the spatial mapping,
wherein the cell value for each cell is determined from a respective plurality of the sensor values including at least one sensor value captured for a coordinate location that is beyond a spatial extent of the cell; and
generating an alert if the cell values fall outside expected values.

31. A method of evaluating an additive manufacturing build, in which a plurality of layers of powder are selectively melted with an energy beam to form an object, the method comprising:
receiving sensor data collected during the additive manufacturing of the object, the sensor data comprising sensor values captured for different coordinate locations of the energy beam during the additive manufacturing of the object;
generating cell values for cells of a spatial mapping of the sensor data, the cells corresponding to one of pixels and voxels of the spatial mapping,
wherein the cell value for each cell is determined from a respective plurality of the sensor values including at least one sensor value captured for a coordinate location that is beyond a spatial extent of the cell; and
verifying the additive manufacturing build based on a comparison of the cell values to expected values.

32. A method of evaluating an additive manufacturing build, in which a plurality of layers of powder are selectively melted with an energy beam to form an object, the method comprising:
receiving sensor data collected during the additive manufacturing of the object, the sensor data comprising sensor values captured for different coordinate locations of the energy beam during the additive manufacturing of the object;
generating cell values for cells of a spatial mapping of the sensor data, the cells corresponding to one of pixels and voxels of the spatial mapping,
wherein the cell value for each cell is determined from a respective plurality of the sensor values including at least one sensor value captured for a coordinate location that is beyond a spatial extent of the cell; and
assessing whether the build and/or the object meet a specification based on the spatial mapping.

\* \* \* \* \*